(12) United States Patent
Fujita et al.

(10) Patent No.: US 10,656,458 B2
(45) Date of Patent: May 19, 2020

(54) LIQUID CRYSTAL DISPLAY PANEL

(71) Applicant: SHARP KABUSHIKI KAISHA, Sakai, Osaka (JP)

(72) Inventors: Kenji Fujita, Sakai (JP); Takayuki Natsume, Sakai (JP); Masaaki Saitoh, Sakai (JP); Masaomi Kuwabara, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/569,049

(22) Filed: Sep. 12, 2019

(65) Prior Publication Data

US 2020/0089049 A1    Mar. 19, 2020

Related U.S. Application Data

(60) Provisional application No. 62/731,590, filed on Sep. 14, 2018.

(51) Int. Cl.
*G02F 1/1335* (2006.01)
*G02F 1/1337* (2006.01)
(Continued)

(52) U.S. Cl.
CPC ...... *G02F 1/133528* (2013.01); *G02F 1/1337* (2013.01); *G02F 1/133308* (2013.01); *G02F 1/13363* (2013.01)

(58) Field of Classification Search
CPC ................................. G02F 1/133528
See application file for complete search history.

(56) References Cited

U.S. PATENT DOCUMENTS

| 2012/0218497 A1 | 8/2012 | Kajita | |
|---|---|---|---|
| 2014/0327863 A1* | 11/2014 | Yanai | G02F 1/13363 349/102 |
| 2015/0124202 A1* | 5/2015 | Kang | G02F 1/133707 349/98 |

FOREIGN PATENT DOCUMENTS

| JP | 2003-107452 A | 4/2003 |
|---|---|---|
| JP | 2006-184809 A | 7/2006 |

(Continued)

*Primary Examiner* — Edmond C Lau
(74) *Attorney, Agent, or Firm* — ScienBiziP, P.C.

(57) ABSTRACT

A liquid crystal display panel includes: a liquid crystal cell that has a liquid crystal layer; first and second linear polarizers arranged on an observer side and a back surface side of the liquid crystal cell; a first retardation layer arranged between the first linear polarizer and the liquid crystal layer; and a second retardation layer arranged between the first retardation layer and the second linear polarizer. The first and second linear polarizers and the first and second retardation layers are arranged so that at least one of following formulas (A) and (B) is satisfied:

$$\tfrac{1}{3} \leq (\cos 2\theta_1)^2 / \sin \Delta \leq \tfrac{3}{2} \quad (A)$$

$$\tfrac{1}{3} \leq (\cos 2\theta_2)^2 / \sin \Delta \leq \tfrac{3}{2} \quad (B)$$

where a difference of retardation between the first retardation layer and the second retardation layer for light with a wavelength of 550 nm is $\Delta$ [rad], an angle formed by an absorption axis of the first linear polarizer and a slow axis of the first retardation layer is $\theta_1$, and an angle formed by an absorption axis of the second linear polarizer and a slow axis of the second retardation layer is $\theta_2$.

10 Claims, 12 Drawing Sheets

(51) Int. Cl.
*G02F 1/1333* (2006.01)
*G02F 1/13363* (2006.01)

(56) References Cited

FOREIGN PATENT DOCUMENTS

| | | |
|---|---|---|
| JP | 2009-229756 A | 10/2009 |
| JP | 2010-160384 A | 7/2010 |
| JP | 2012-173672 A | 9/2012 |

* cited by examiner

FIG. 9A

| FIRST LINEAR POLARIZER | ABSORPTION AXIS: 0° |
| FIRST RETARDATION LAYER | Re=137.5 nm (Γ=90°), Nz=1, SLOW AXIS: 45° |
| LIQUID CRYSTAL CELL | VA MODE, Δn·d=360 nm |
| SECOND RETARDATION LAYER | Re=137.5 nm (Γ=90°), Nz=1, SLOW AXIS: 135° |
| SECOND LINEAR POLARIZER | ABSORPTION AXIS: 90° |

FIG. 9B

| FIRST LINEAR POLARIZER | ABSORPTION AXIS: 0° |
| FIRST RETARDATION LAYER | Re=137.5 nm (Γ=90°), Nz=1, SLOW AXIS: θ |
| LIQUID CRYSTAL CELL | VA MODE, Δn·d=360 nm |
| SECOND RETARDATION LAYER | Γ=90°+Δ, Nz=1, SLOW AXIS: 90°−θ |
| SECOND LINEAR POLARIZER | ABSORPTION AXIS: 90° |

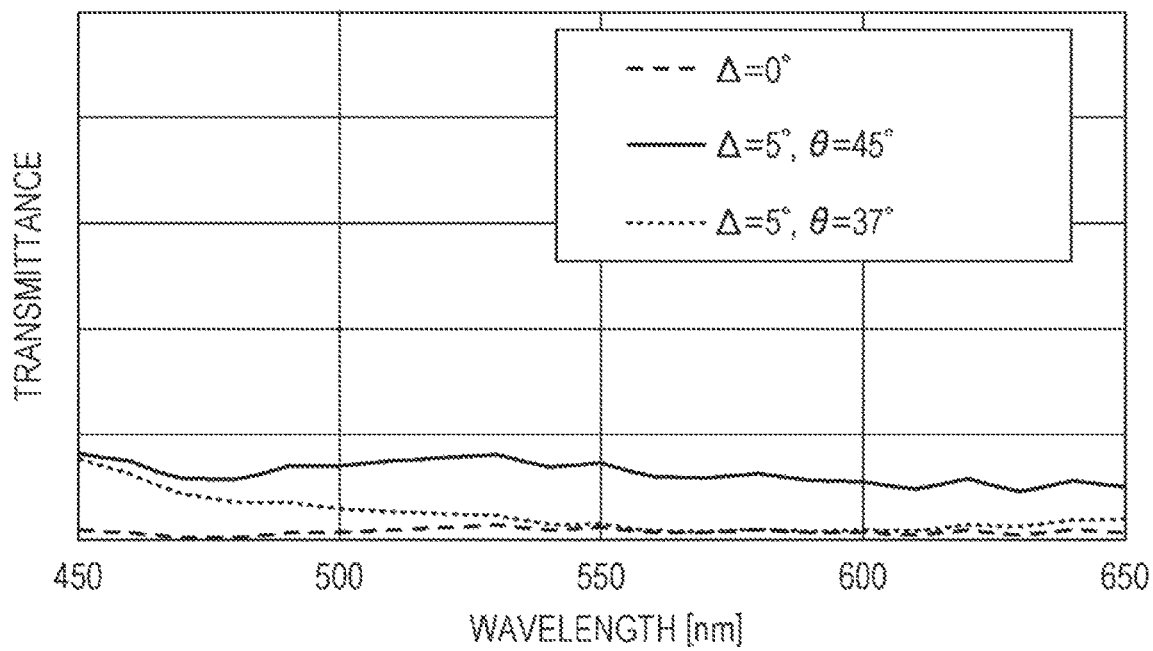

FIG. 10

LIQUID CRYSTAL DISPLAY PANEL

BACKGROUND

1. Technical Field

The present invention relates to a liquid crystal display panel.

2. Description of the Related Art

In recent years, definition of a liquid crystal display panel has become higher and a pixel aperture ratio (ratio of a total area of pixel apertures relative to a display region) has been reduced accordingly. This has made it difficult to achieve sufficient display luminance. In particular, a medium-sized or small-sized liquid crystal display panel for mobile use has a problem of reduction of a contrast ratio when observed in a bright environment such as outdoors.

A countermeasure that display luminance is increased by increasing luminance of a backlight and the contrast ratio is thereby increased has been made so far. However, the increase of the luminance of the backlight causes a disadvantage of increase of power consumption and the countermeasure made by increasing the luminance of the backlight approaches a limit.

One of factors of the reduction of the contrast ratio of the liquid crystal display panel in the bright environment is reflection by the liquid crystal display panel. Thus, it is also attempted to improve the contrast ratio by suppressing the reflection by the liquid crystal display panel.

For example, Patent Document 1 (Japanese Unexamined Patent Application Publication No. 2012-173672) discloses a liquid crystal display panel in which a retardation plate (also referred to as a "front-side retardation plate") is provided between a linearly polarizing plate (also referred to as a "front-side linearly polarizing plate") arranged on an observer side (also referred to as a "front side") and a liquid crystal cell so that output of light, which has been reflected by the liquid crystal cell, to the observer side is suppressed. The front-side retardation plate is a so-called λ/4 plate that is set so that linearly polarized light transmitted through the front-side linearly polarizing plate becomes circularly polarized light rotating in a first direction and enters the liquid crystal cell. Thus, a combination of the front-side linearly polarizing plate and the front-side retardation plate functions as a circularly polarizing plate. When the circularly polarized light is reflected (by an interface where a refractive index changes from a low level to a high level), phases of both a P wave and an S wave are shifted by n radian, resulting that a rotation direction is reversed. Thus, the light reflected by the liquid crystal cell (transparent substrate) becomes circularly polarized light a rotation direction of which is a second direction reverse to the first direction, and linearly polarized light that is converted from the circularly polarized light when passing through the front-side retardation plate is absorbed by the front-side linearly polarizing plate.

The liquid crystal display panel of Patent Document 1 further includes a retardation plate (also referred to as a "back-side retardation plate") that is arranged between a linearly polarizing plate (also referred to as a "back-side linearly polarizing plate") arranged on a backlight side (also referred to as a "back side") and the liquid crystal cell, and the back-side retardation plate is a so-called λ/4 plate that is set so that linearly polarized light transmitted through the back-side linearly polarizing plate becomes circularly polarized light, a rotation direction of which is the second direction reverse to the first direction, when passing through the back-side retardation plate and a liquid crystal layer in a state of display in black. Thus, a combination of the back-side linearly polarizing plate and the back-side retardation plate also functions as a circularly polarizing plate. When passing through the front-side retardation plate, the circularly polarized light whose rotation direction is the second direction is converted into linearly polarized light absorbed by the front-side polarizing plate. That is, the front-side retardation plate and the back-side retardation plate are arranged so that retardation is cancelled at a time of display in black. According to Patent Document 1, the liquid crystal display panel capable of achieving excellent image quality even when being used outdoors is obtained.

Patent Document 1 also describes that the front-side retardation plate and the back-side retardation plate may be arranged (also referred to as "made in an in-cell form") in the liquid crystal cell. Further, Patent Document 1 describes that the front-side retardation plate and the back-side retardation plate may be a coating film. A retardation plate which is the coating film, that is, a retardation plate formed by a coating method is also called a "retardation plate of a coating type". The retardation plate of the coating type is expected as a technique of making the retardation plate in an in-cell form.

SUMMARY

Though use of the circularly polarizing plate as in Patent Document 1 is considered to achieve improvement of the contrast ratio, it is found from examination by inventors of the present application that a degree of the improvement actually tends to vary. One of factors of the variation is manufacturing variation in retardation of a retardation plate. When the retardation is not sufficiently cancelled between the front-side retardation plate and the back-side retardation plate due to the manufacturing variation in the retardation, light leakage occurs at a time of display in black and the contrast ratio is reduced. The manufacturing variation in the retardation is remarkable particularly in the retardation plate of the coating type.

The invention is made in view of the aforementioned problems and an object thereof is to provide a liquid crystal display panel in which reduction of a contrast ratio caused by manufacturing variation in retardation of a retardation layer is suppressed.

The present specification discloses a liquid crystal display panel described in the following items.

[Item 1]

Provided is a liquid crystal display panel including: a liquid crystal cell that has a first substrate, a second substrate arranged on a back surface side of the first substrate, and a liquid crystal layer provided between the first substrate and the second substrate;

a first linear polarizer arranged on an observer side of the liquid crystal cell;

a second linear polarizer arranged on a back surface side of the liquid crystal cell;

a first retardation layer arranged between the first linear polarizer and the liquid crystal layer; and a second retardation layer arranged between the first retardation layer and the second linear polarizer, in which an absorption axis of the first linear polarizer and an absorption axis of the second linear polarizer cross, each of a combination of the first linear polarizer and the first retardation layer and a combination of the second linear polarizer and the second retardation layer functions as a circularly polarizing plate or an elliptically polarizing plate, retardation of the first retardation layer and retardation of the second retardation layer for light with a wavelength of 550 nm are different, and the first linear polarizer, the first retardation layer, the second linear polarizer, and the second retardation layer are arranged so that at least one of following formulas (A) and (B) is satisfied:

$$\tfrac{1}{3} \le (\cos 2\theta_1)^2/\sin \Delta \le \tfrac{3}{2} \qquad (A)$$

$$\tfrac{1}{3} \le (\cos 2\theta_2)^2/\sin \Delta \le \tfrac{3}{2} \qquad (B)$$

where a difference between the retardation of the first retardation layer and the retardation of the second retardation layer for the light with the wavelength of 550 nm is $\Delta$ [rad], an angle formed by the absorption axis of the first linear polarizer and a slow axis of the first retardation layer is $\theta_1$, and an angle formed by the absorption axis of the second linear polarizer and a slow axis of the second retardation layer is $\theta_2$.

[Item 2]

Provided is the liquid crystal display panel according to the item 1, in which the first linear polarizer, the first retardation layer, the second linear polarizer, and the second retardation layer are arranged so that both of the formulas (A) and (B) are satisfied.

[Item 3]

Provided is the liquid crystal display panel according to the item 1 or 2, in which the first linear polarizer, the first retardation layer, the second linear polarizer, and the second retardation layer are arranged so that at least one of following formulas (C) and (D) is satisfied:

$$0.7 \le (\cos 2\theta_1)^2/\sin \Delta \le 1.0 \qquad (C)$$

$$0.7 \le (\cos 2\theta_2)^2/\sin \Delta \le 1.0 \qquad (D)$$

[Item 4]

Provided is the liquid crystal display panel according to the item 3, in which the first linear polarizer, the first retardation layer, the second linear polarizer, and the second retardation layer are arranged so that both of the formulas (C) and (D) are satisfied.

[Item 5]

Provided is the liquid crystal display panel according to any of the items 1 to 4, in which the liquid crystal layer is a liquid crystal layer of a vertical alignment type.

[Item 6]

Provided is the liquid crystal display panel according to any of the items 1 to 4, in which the liquid crystal layer is a liquid crystal layer of a horizontal alignment type.

[Item 7]

Provided is the liquid crystal display panel according to any of the items 1 to 6, in which the second retardation layer is arranged between the liquid crystal layer and the second linear polarizer.

[Item 8]

Provided is the liquid crystal display panel according to any of the items 1 to 6, in which the second retardation layer is arranged between the first retardation layer and the liquid crystal layer.

[Item 9]

Provided is the liquid crystal display panel according to any of the items 1 to 8, in which at least one of the first retardation layer and the second retardation layer is arranged in the liquid crystal cell.

[Item 10]

Provided is the liquid crystal display panel according to any of the items 1 to 9, in which at least one of the first retardation layer and the second retardation layer is a retardation plate of a coating type.

Advantageous Effects of Invention

According to an embodiment of the invention, a liquid crystal display panel in which reduction of a contrast ratio caused by manufacturing variation in retardation of a retardation layer is suppressed is provided.

BRIEF DESCRIPTION OF THE DRAWINGS

FIG. 9A illustrates a model used to calculate a preferable nip angle θ.

FIG. 9B illustrates a model used to calculate a preferable nip angle θ.

FIG. 10 is a graph illustrating a result of calculating a transmission spectrum at a time of display in black in cases where $\Delta=0°$ and $\theta=45°$, $\Delta=5°$ and $\theta=45°$, and $\Delta=5°$ and $\theta=37°$.

DETAILED DESCRIPTION

Embodiments of the invention will be described below with reference to the drawings. Note that, the invention is not limited to the following embodiments.

Embodiment 1

Figure 1:
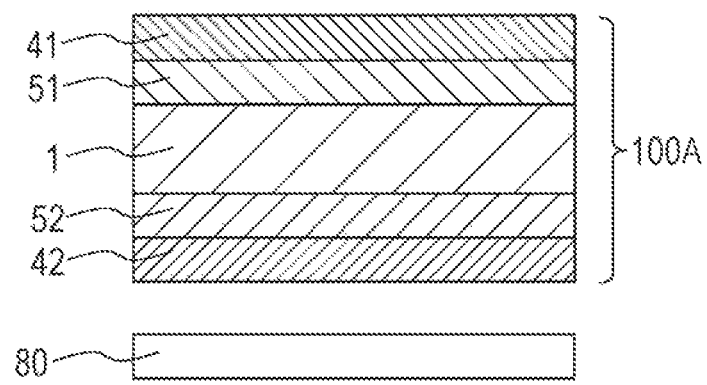
FIG. 1 is a sectional view schematically illustrating a liquid crystal display panel 100A according to an embodiment of the invention.
Figure 2:
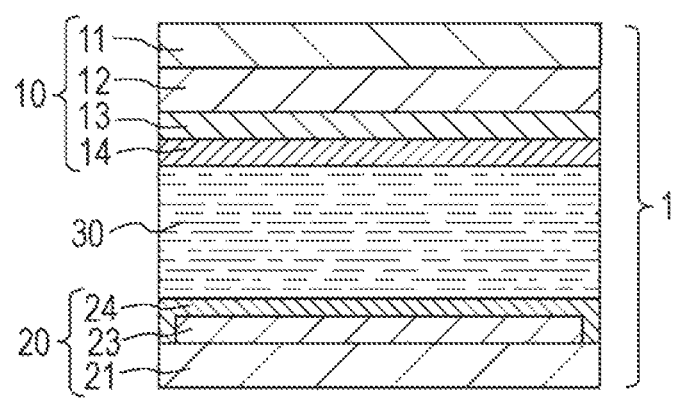
FIG. 2 is a sectional view schematically illustrating a region corresponding to one pixel of a liquid crystal cell 1 provided in the liquid crystal display panel 100A.

With reference to FIGS. 1 and 2, a liquid crystal display panel 100A of the present embodiment will be described. FIG. 1 is a sectional view schematically illustrating the liquid crystal display panel 100A and illustrates a backlight 80 together. That is, it may be stated that FIG. 1 illustrates a liquid crystal display apparatus including the liquid crystal display panel 100A and the backlight 80. FIG. 2 is a sectional view schematically illustrating a region corresponding to one pixel of a liquid crystal cell 1 provided in the liquid crystal display panel 100A.

The liquid crystal display panel 100A of the present embodiment has a plurality of pixels arranged in a matrix pattern and performs display in a VA (vertical alignment) mode. As illustrated in FIG. 1, the liquid crystal display panel 100A includes the liquid crystal cell 1, a first linear polarizer 41, a second linear polarizer 42, a first retardation layer 51, and a second retardation layer 52.

As illustrated in FIG. 2, the liquid crystal cell 1 has a first substrate 10, a second substrate 20 arranged on a back surface side of the first substrate 10, and a liquid crystal layer 30 provided between the first substrate 10 and the second substrate 20.

The first substrate (also called a "color filter substrate") 10 has a transparent substrate 11, a color filter layer 12, a common electrode 13, and a first vertical alignment film 14.

The transparent substrate 11 is transparent and has an insulating property. The transparent substrate 11 is, for example, a glass substrate or a plastic substrate.

The color filter layer 12 is provided on the transparent substrate 11. The color filter layer 12 typically includes a red color filter, a green color filter, and a blue color filter.

The common electrode 13 is provided on the color filter layer 12. The common electrode 13 faces a pixel electrode 23 described later and is thus also called a "facing electrode". The common electrode 13 is formed by a transparent conductive material (for example, ITO). The common electrode 13 may be a single conductive film commonly provided in a plurality of pixels.

The first vertical alignment film 14 covers the common electrode 13. The first vertical alignment film 14 has an alignment controlling force of causing liquid crystal molecules contained in the liquid crystal layer 30 to be aligned almost vertically to a surface thereof.

The second substrate (also called an "active matrix substrate") 20 has a transparent substrate 21, the pixel electrode 23, and a second vertical alignment film 24.

The transparent substrate 21 is transparent and has an insulating property. The transparent substrate 21 is, for example, a glass substrate or a plastic substrate.

The pixel electrode 23 is provided on the transparent substrate 21. The pixel electrode 23 is provided in each of a plurality of pixels. The pixel electrode 23 is formed by a transparent conductive material (for example, ITO).

The second vertical alignment film 24 covers the pixel electrode 23. The second vertical alignment film 24 has an alignment controlling force of causing the liquid crystal molecules contained in the liquid crystal layer 30 to be aligned almost vertically to a surface thereof.

The second substrate 20 further has a thin film transistor (TFT) electrically connected to the pixel electrode 23, a scanning wire that supplies a scanning signal to the TFT, a signal wire that supplies a display signal to the TFT, and the like (none of which is illustrated).

When a voltage is not applied to the liquid crystal layer 30, the liquid crystal molecules contained in the liquid crystal layer 30 take a vertically aligned state by the alignment controlling forces of the first vertical alignment film 14 and the second vertical alignment film 24. That is, the liquid crystal layer 30 is a vertical alignment type.

As illustrated in FIG. 1, the first linear polarizer 41 is arranged on an observer side of the liquid crystal cell 1. On the other hand, the second linear polarizer 42 is arranged on a back surface side (backlight 80 side) of the liquid crystal cell 1.

The first retardation layer 51 is arranged between the first linear polarizer 41 and the liquid crystal layer 30. Here, the first retardation layer 51 is arranged between the first linear polarizer 41 and the liquid crystal cell 1.

The second retardation layer 52 is arranged between the first retardation layer 51 and the second linear polarizer 42. Here, the second retardation layer 52 is arranged between the liquid crystal cell 1 and the second linear polarizer 42, more specifically, between the liquid crystal cell 1 and the second linear polarizer 42.

As the first linear polarizer 41 and the second linear polarizer 42, a general linearly polarizing plate, specifically, a PVA (polyvinyl alcohol) film that contains iodine and is stretched is usable. In such a linearly polarizing plate, a direction in which the PVA film is stretched is an absorption axis.

As a material of the first retardation layer 51 and the second retardation layer 52, for example, COP (cycloolefin resin) is usable. The COP is widely used as a retardation film having a wide range and is widely used also as a support of the PVA film. When being stretched, the COP has a birefringence property.

An absorption axis of the first linear polarizer 41 and an absorption axis of the second linear polarizer 42 cross. The absorption axis of the first linear polarizer 41 and the absorption axis of the second linear polarizer 42 may be almost orthogonal or may cross at an angle which may not be stated as being almost orthogonal.

A combination of the first linear polarizer 41 and the first retardation layer 51 functions as a circularly polarizing plate or an elliptically polarizing plate. Light transmitted through the first linear polarizer 41 and the first retardation layer 51 from the observer side enters the liquid crystal cell as circularly polarized light or elliptically polarized light that rotates in a first direction.

Similarly, a combination of the second linear polarizer 42 and the second retardation layer 52 also functions as a circularly polarizing plate or an elliptically polarizing plate. Light transmitted through the second linear polarizer 42 and the second retardation layer 52 from the back surface side enters the liquid crystal cell as circularly polarized light or elliptically polarized light in a second direction reverse to the first direction.

In this manner, when each of the combination of the first linear polarizer 41 and the first retardation layer 51 and the combination of the second linear polarizer 42 and the second retardation layer 52 functions as the circularly polarizing plate or the elliptically polarizing plate, a contrast ratio is able to be improved by suppressing output of light, which has been reflected by the liquid crystal cell 1, to the observer side by a principle similar to that of the liquid crystal display panel of Patent Document 1.

Here, it is set that a difference between retardation of the first retardation layer 51 and retardation of the second retardation layer 52 is $\Delta$ [rad], an angle formed by the absorption axis of the first linear polarizer 41 and a slow axis of the first retardation layer 51 is $\theta_1$, and an angle formed by the absorption axis of the second linear polarizer 42 and a slow axis of the second retardation layer 52 is $\theta_2$. The retardation difference $\Delta$ is represented by the following formula (1).

$$\Delta = 2\pi \times |ROf - ROr|/\lambda \quad (1)$$

In the formula (1), $\lambda$ is 550 [nm], ROf is a retardation value [nm] of the first retardation layer 51 for light with a wavelength of 550 nm, and ROr is a retardation value [nm] of the second retardation layer 52 for the light with the wavelength of 550 nm. That is, $\Delta$ is a difference between the retardation of the first retardation layer 51 and the retardation of the second retardation layer 52 for the light with the wavelength of 550 nm. Further, hereinafter, the angle $\theta_1$ formed by the absorption axis of the first linear polarizer 41 and the slow axis of the first retardation layer 51 is also called a "front-side nip angle" and the angle $\theta_2$ formed by the absorption axis of the second linear polarizer 42 and the slow axis of the second retardation layer 52 is also called a "back-side nip angle".

In the present embodiment, the retardation of the first retardation layer 51 and the retardation of the second retardation layer 52 for the light with the wavelength of 550 nm are different (that is, $\Delta \neq 0$). In addition, in the present embodiment, the first linear polarizer 41, the first retardation layer 51, the second linear polarizer 42, and the second retardation layer 52 are arranged so that the following formulas (A) and (B) are satisfied.

$$\tfrac{1}{3} \leq (\cos 2\theta_1)^2 / \sin \Delta \leq \tfrac{3}{2} \quad (A)$$

$$\tfrac{1}{3} \leq (\cos 2\theta_2)^2 / \sin \Delta \leq \tfrac{3}{2} \quad (B)$$

In the liquid crystal display panel 100A of the present embodiment, reduction of the contrast ratio caused by manufacturing variation in the retardation of the retardation layers is suppressed by the aforementioned configuration. Prior to description for a reason therefor, a conventional liquid crystal display panel including a circularly polarizing plate will be first described below with reference to FIG. 3.

Figure 3:
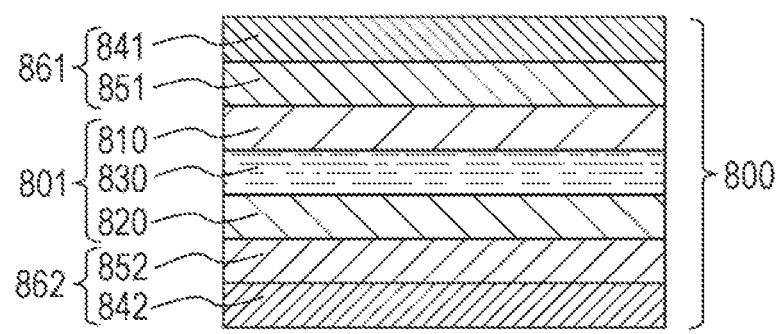
FIG. 3 is a sectional view illustrating a conventional liquid crystal display panel 800 including a circularly polarizing plate.

A liquid crystal display panel 800 illustrated in FIG. 3 includes a liquid crystal cell 801, a front-side circularly polarizing plate 861 arranged on an observer side of the liquid crystal cell 801, and a back-side circularly polarizing plate 862 arranged on a back surface side of the liquid crystal cell 801. The liquid crystal cell 801 has a liquid crystal layer 830 of a vertical alignment type, a color filter substrate 810 positioned on the observer side of the liquid crystal layer 830, and an active matrix substrate 820 positioned on the back surface side of the liquid crystal layer 830.

The front-side circularly polarizing plate 861 is constituted by a front-side linearly polarizing plate 841 and a front-side $\lambda/4$ plate (quarter wavelength plate) 851 that is arranged on the back surface side of the front-side linearly polarizing plate 841. The back-side circularly polarizing plate 862 is constituted by a back-side linearly polarizing plate 842 and a back-side $\lambda/4$ plate (quarter wavelength plate) 852 that is arranged on the observer side of the back-side linearly polarizing plate 842.

Figure 4:
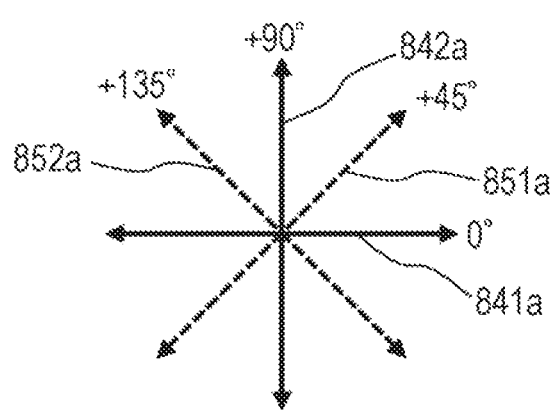
FIG. 4 illustrates a relationship between absorption axes 841a and 842a of a front-side linearly polarizing plate 841 and a back-side linearly polarizing plate 842 and slow axes 851a and 852a of a front-side λ/4 plate 851 and a back-side λ/4 plate 852.

FIG. 4 illustrates a relationship between absorption axes 841a and 842a of the front-side linearly polarizing plate 841 and the back-side linearly polarizing plate 842 and slow axes 851a and 852a of the front-side $\lambda/4$ plate 851 and the back-side $\lambda/4$ plate 852. FIG. 4 illustrates an azimuthal angle together. When a display plane is assumed to be a face of a clock, a 3 o'clock direction corresponds to an azimuthal angle of 0° and a counterclockwise direction is a forward direction.

As illustrated in FIG. 4, the absorption axis 841a of the front-side linearly polarizing plate 841 and the absorption axis 842a of the back-side linearly polarizing plate 842 cross. That is, the front-side linearly polarizing plate 841 and the back-side linearly polarizing plate 842 are arranged in crossed Nicols. Moreover, an angle (front-side nip angle) formed by the absorption axis 841a of the front-side linearly polarizing plate 841 and the slow axis 851a of the front-side $\lambda/4$ plate 851 is 45°. Similarly, an angle (back-side nip angle) formed by the absorption axis 842a of the back-side linearly polarizing plate 842 and the slow axis 852a of the back-side $\lambda/4$ plate 852 is 45°.

In the liquid crystal display panel 800 including a pair of circularly polarizing plates (the front-side circularly polarizing plate 861 and the back-side circularly polarizing plate 862), similarly to the liquid crystal display panel disclosed in Patent Document 1, a contrast ratio is improved by suppressing output of light, which has been reflected by the liquid crystal cell 801, to the observer side.

When retardation of the front-side $\lambda/4$ plate 851 and retardation of the back-side $\lambda/4$ plate 852 are different, however, light leakage occurs at a time of display in black and the contrast ratio is reduced. That is, due to manufacturing variation in the retardation of the front-side $\lambda/4$ plate 851 and the back-side $\lambda/4$ plate 852, a degree of improvement of the contrast ratio varies.

The inventors of the present application finds that, by setting the absorption axis of the first linear polarizer 41, the slow axis of the first retardation layer 51, the absorption axis of the second linear polarizer 42, and the slow axis of the second retardation layer 52 to have independently appropriate angles, in other words, by adjusting the front-side nip angle $\theta_1$ and the back-side nip angle $\theta_2$, the contrast ratio is able to be further improved.

Figure 5A:
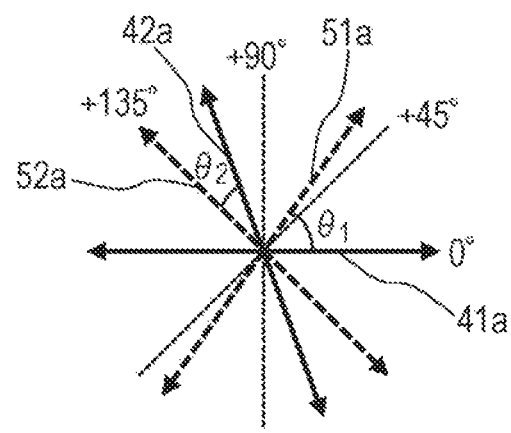
FIG. 5A illustrates an example of a relationship between an absorption axis 41a of a first linear polarizer 41, a slow axis 51a of a first retardation layer 51, an absorption axis 42a of a second linear polarizer 42, and a slow axis 52a of a second retardation layer 52.
Figure 5B:
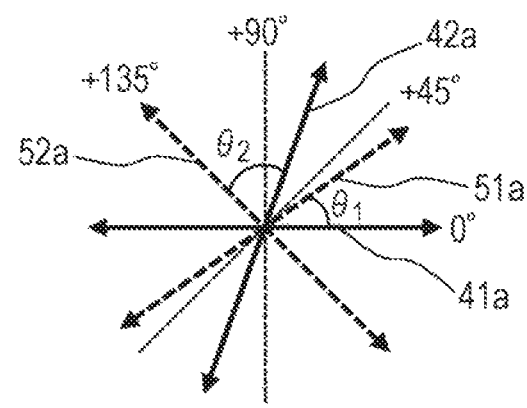
FIG. 5B illustrates an example of a relationship between the absorption axis 41a of the first linear polarizer 41, the slow axis 51a of the first retardation layer 51, the absorption axis 42a of the second linear polarizer 42, and the slow axis 52a of the second retardation layer 52.

FIGS. 5A and 5B each illustrate an example of a relationship between the absorption axis 41a of the first linear polarizer 41, the slow axis 51a of the first retardation layer 51, the absorption axis 42a of the second linear polarizer 42, and the slow axis 52a of the second retardation layer 52.

FIG. 5A illustrates an example when the retardation of the second retardation layer 52 for the light with the wavelength of 550 nm is smaller than the retardation of the first retardation layer 51. In the example illustrated in FIG. 5A, the angle (front-side nip angle) $\theta_1$ formed by the absorption axis 41a of the first linear polarizer 41 and the slow axis 51a of the first retardation layer 51 is over 45°. Moreover, the angle (back-side nip angle) $\theta_2$ formed by the absorption axis 42a of the second linear polarizer 42 and the slow axis 52a of the second retardation layer 52 is less than 45°. Further, the absorption axis 41a of the first linear polarizer 41 and the absorption axis 42a of the second linear polarizer 42 are not orthogonal.

FIG. 5B illustrates an example when the retardation of the first retardation layer 51 for the light with the wavelength of 550 nm is smaller than the retardation of the second retardation layer 52. In the example illustrated in FIG. 5B, the angle (front-side nip angle) $\theta_1$ formed by the absorption axis 41a of the first linear polarizer 41 and the slow axis 51a of the first retardation layer 51 is less than 45°. Moreover, the angle (back-side nip angle) $\theta_2$ formed by the absorption axis 42a of the second linear polarizer 42 and the slow axis 52a of the second retardation layer 52 is over 45°. Further, the absorption axis 41a of the first linear polarizer 41 and the absorption axis 42a of the second linear polarizer 42 are not orthogonal.

In this manner, in the examples illustrated in FIGS. 5A and 5B, the front-side nip angle $\theta_1$ and the back-side nip angle $\theta_2$ are deviated from 45°, and therefore, the formulas (A) and (B) are satisfied. Note that, as described later, it is not always necessary for both of the formulas (A) and (B) to be satisfied. Only one of the formulas (A) and (B) may be satisfied, and in this case, one of the front-side nip angle $\theta_1$ and the back-side nip angle $\theta_2$ may be 45°. Note that, in the examples illustrated in FIGS. 5A and 5B, the absorption axis 41a of the first linear polarizer 41 and the absorption axis 42a of the second linear polarizer 42 are not orthogonal (that is, the first linear polarizer 41 and the second linear polarizer 42 are deviated from arrangement in crossed Nicols), but the embodiment of the invention is not limited thereto. A size of the front-side nip angle $\theta_1$ and/or the back-side nip angle $\theta_2$ may be appropriately set in a state where the absorption axis 41a of the first linear polarizer 41 and the absorption axis 42a of the second linear polarizer 42 are almost orthogonal.

Here, a principle that the contrast ratio is reduced due to occurrence of light leakage at the time of display in black will be described by taking the liquid crystal display panel 800 illustrated in FIG. 3 as an example. Here, considered is a case where a retardation value of one of a pair of λ/4 plates (the front-side λ/4 plate 851 and the back-side λ/4 plate 852) provided in the liquid crystal display panel 800 is deviated from a designed value, specifically, a case where the retardation of the back-side λ/4 plate 852 is larger than 137.5 nm which is the designed value (for example, larger by 7.5 nm). Note that, unless otherwise noted, a "polarized state" and "retardation" respectively refer to a polarized state and retardation for the light with the wavelength of 550 nm.

A principle of occurrence of light leakage will be described as follows with reference to a Poincare sphere.

Figure 6:
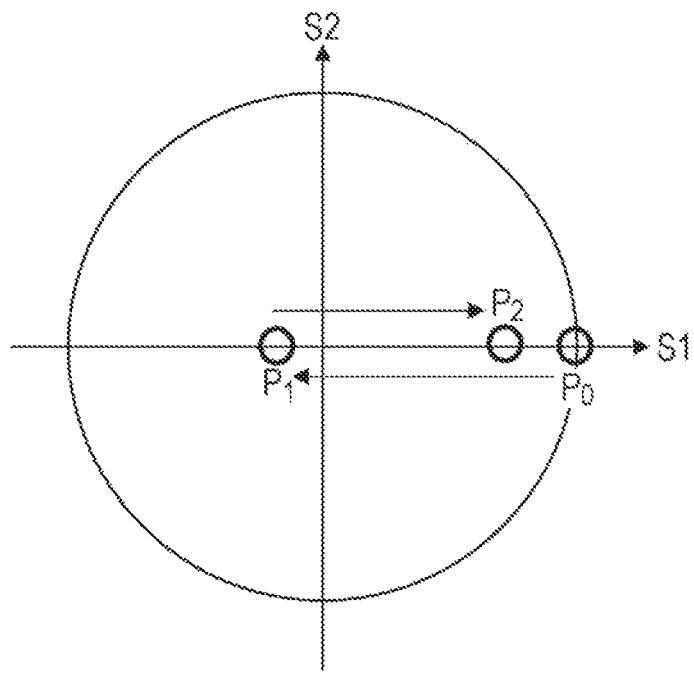
FIG. 6 is a view in which polarized states before and after light is transmitted through each constituent member when observed from a direction normal to a display plane in the liquid crystal display panel 800 are projected on an S1-S2 plane of the Poincare sphere.

FIG. 6 is a view in which polarized states before and after light is transmitted through each constituent member when observed from a direction normal to the display plane in the liquid crystal display panel 800 are projected on an S1-S2 plane of the Poincare sphere.

First, the polarized state immediately after light entering the liquid crystal display panel 800 from the back surface side is transmitted through the back-side linearly polarizing plate 842 is at a position of a point $P_0$. The polarized state immediately after the light is transmitted through the back-side λ/4 plate 852 thereafter is at a position of a point $P_1$. When the retardation of the back-side λ/4 plate 852 completely satisfies a condition of λ/4 (137.5 nm for the light with the wavelength of 550 nm), the polarized state is to move to a position of (S1, S2)=(0, 0). In the present example, however, since the retardation of the back-side λ/4 plate 852 is greater than the condition of λ/4, the polarized state excessively moves. Note that, since the liquid crystal cell 801 at the time of display in black is designed so that the retardation when observed from the direction normal to the display plane is zero, the polarized state when the light is transmitted through the liquid crystal cell 801 stays at the position of $P_1$.

Next, the polarized state after the light is transmitted through the front-side λ/4 plate 851 is at a position of a point $P_2$. At this time, though the polarized state moves in a direction reverse to a direction in which the polarized state is moved by the back-side λ/4 plate 852 on the Poincare sphere, a distance of the movement is different because the retardation of the front-side λ/4 plate 851 is smaller than the retardation of the back-side λ/4 plate 852.

Here, a condition under which the transmitted light is completely absorbed by the front-side linearly polarizing plate 841 is that the polarized state at the point $P_2$ is completely linearly polarized light, that is, a circularly polarized light component S3 is 0 and that the polarized state is at a position on the equator of the Poincare sphere. However, as described above, when the distance of the movement is different, the polarized state does not completely return to the equator, resulting that a part of the light is transmitted through the front-side linearly polarizing plate 841 and light leakage occurs.

Note that, a case where the retardation of the back-side λ/4 plate 852 is greater than the condition of λ/4 is assumed here, however, when the retardation is different between the front-side λ/4 plate 851 and the back-side λ/4 plate 852, light leakage occurs for the same reason, irrespective of a magnitude relationship therebetween. Retardation values of the λ/4 plates are not always able to be completely the same due to convenience of production, which is a factor of variation in the contrast ratio of the liquid crystal display panel.

As has been described, in the present embodiment, the front-side nip angle $\theta_1$ and the back-side nip angle $\theta_2$ are deviated from 45°, and therefore, the contrast ratio is improved. On the other hand, in the liquid crystal display panel 800 illustrated in FIG. 3, it is also considered that an angle at which the front-side circularly polarizing plate 861 and/or the back-side circularly polarizing plate 862 are/is attached is adjusted while the front-side nip angle and the back-side nip angle are kept at 45°. In this case, the angle formed by the absorption axis of the front-side linearly polarizing plate 841 and the absorption axis of the back-side linearly polarizing plate 842 is deviated from 90°. According to such a method, however, as described below, there is a principle limit in improvement of the contrast ratio.

Figure 7:
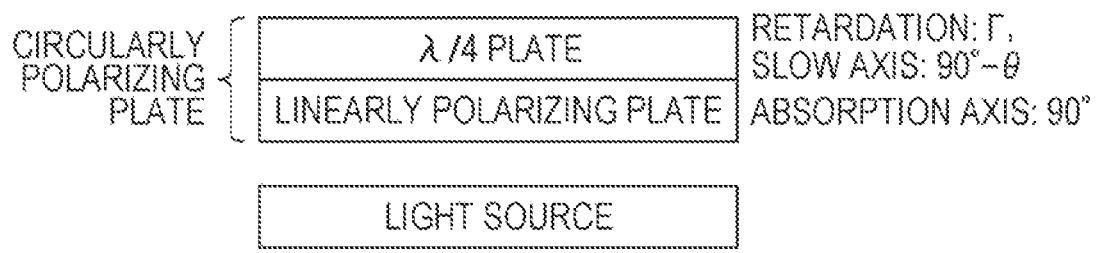
FIG. 7 illustrates a circularly polarizing plate as a model for explaining that there is a limit in improvement of a contrast ratio even when an angle at which a circularly polarizing plate is attached is adjusted while a nip angle is kept at 45°.

FIG. 7 illustrates a circularly polarizing plate as a model for explanation. In the model illustrated in FIG. 7, a linearly polarizing plate is arranged so that an azimuth of an absorption axis thereof is 90°. Further, a λ/4 plate is arranged so that an azimuth of a slow axis thereof is 90°−θ. That is, an angle (nip angle) formed by the absorption axis of the linearly polarizing plate and the slow axis of the λ/4 plate is θ. When a retardation value in nm of the λ/4 plate is Re, a retardation value Γ in rad is represented as Π=2πRe/λ (here, λ is 550 nm). At this time, the circularly polarized light component S3 of light output from a light source and transmitted through the circularly polarizing plate is represented as S3=sin Γ·sin 2θ.

In order to absorb the light, which has been transmitted through the back-side circularly polarizing plate 862, by the front-side circularly polarizing plate 861 without leakage, absolute values of circularly polarized light components S3 of the light transmitted through the back-side circularly polarizing plate 862 and the light transmitted through the front-side circularly polarizing plate 861 need to be the same. When the nip angle θ is fixed at 45°, however, the absolute values of S3 (=sin Γ·sin 2θ) are always different as long as retardation values Γ are different, and therefore, a certain degree of light leakage occurs.

On the other hand, by adjusting the front-side nip angle $θ_1$ and/or the back-side nip angle $θ_2$ as in the embodiment of the invention, absolute values of the circularly polarized light components S3 for the light transmitted through the first linear polarizer 41 and the first retardation layer 51 and the light transmitted through the second linear polarizer 42 and the second retardation layer 52 are able to be sufficiently close values. This makes it possible to effectively improve the contrast ratio.

Figure 8A:
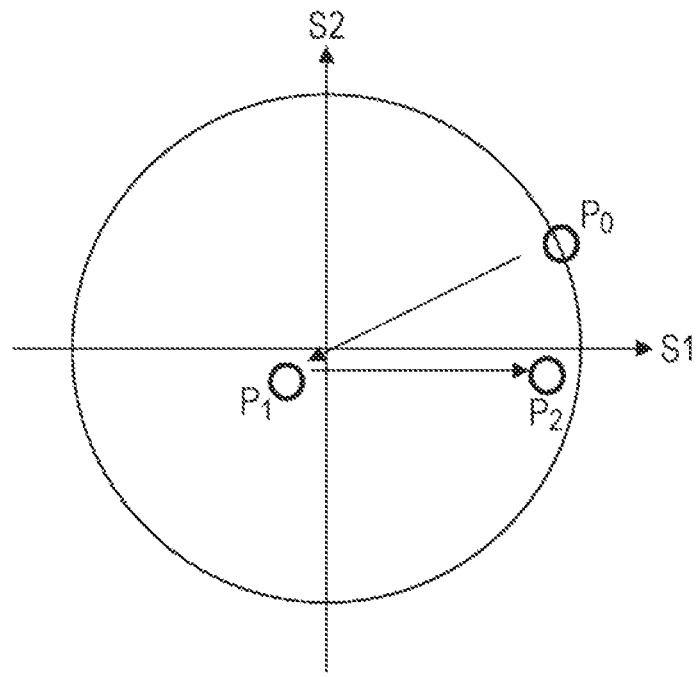
FIG. 8A illustrates a change of a polarized state when the angle at which the circularly polarizing plate is attached is adjusted while a front-side nip angle and a back-side nip angle are kept at 45°.

FIG. 8A illustrates a change of the polarized state when the angle at which the back-side circularly polarizing plate 862 is attached is adjusted while the front-side nip angle and the back-side nip angle are kept at 45°.

First, the polarized state immediately after the light entering the liquid crystal display panel 800 from the back surface side is transmitted through the back-side linearly polarizing plate 842 is at the position of the point Pa. The polarized state immediately after the light is transmitted through the back-side λ/4 plate 852 thereafter is at the position of the point $P_1$. Here, since the retardation of the back-side λ/4 plate 852 does not satisfy the condition of λ/4 (greater than the condition of λ/4), the polarized state is deviated from the position of (S1, S2)=(0, 0). Next, the polarized state after the light is transmitted through the front-side λ/4 plate 851 is at the position of the point $P_2$. At this time, the polarized state still does not return to the position on the equator.

Figure 8B:
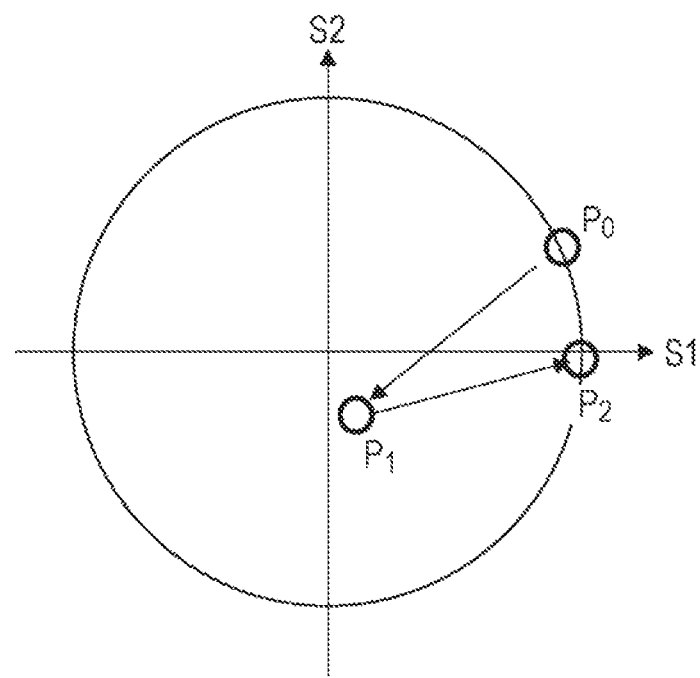
FIG. 8B illustrates a change of the polarized state when the front-side nip angle and/or the back-side nip angle are/is appropriately set.

On the other hand, by appropriately setting the front-side nip angle $θ_1$ and/or the back-side nip angle $θ_2$ as in the embodiment of the invention, a direction of a rotation axis when the polarized state moves on the Poincare sphere is able to be adjusted, and therefore, the polarized state (point Pc) of the light that has entered from the back side is able to return to the position (point $P_2$) on the equator after transmission through the first retardation layer 51 as illustrated in FIG. 8B.

Here, a result of calculating a preferable nip angle θ when there is a difference of the retardation value between the first retardation layer 51 and the second retardation layer 52 after performing simulation of a transmittance in a state of display in black (when no voltage is applied) by using a liquid crystal optical simulator (production name: LCD Master) manufactured by SHINTEC Co., Ltd. will be described.

The nip angle θ is calculated by using models illustrated in FIGS. 9A and 9B.

FIG. 9A illustrates a model when Δ=0 and the nip angle θ is not adjusted (is kept at 45°). In the model illustrated in FIG. 9A, the first linear polarizer 41 is arranged so that an azimuth of the absorption axis thereof is 0°. The retardation Re of the first retardation layer 51 is 137.5 nm (that is, Γ=90°). The first retardation layer 51 is arranged so that an azimuth of the slow axis thereof is 45°. Thus, the front-side nip angle θ1 is 45°. An Nx coefficient of the first retardation layer 51 is 1. The liquid crystal cell 1 is a liquid crystal cell of a VA mode. A refractive index anisotropy Δn of the liquid crystal layer 30 is 0.113, a thickness (cell gap) is 3.2 μm, and Δn·d of the liquid crystal cell 1 is 360 nm. The retardation Re of the second retardation layer 52 is 137.5 nm (that is, Γ=90°). The second retardation layer 52 is arranged so that an azimuth of the slow axis thereof is 135°. An Nx coefficient of the second retardation layer 52 is 1. The second linear polarizer 42 is arranged so that an azimuth of the absorption axis thereof is 90°. Thus, the back-side nip angle $θ_2$ is 45°.

FIG. 9B illustrates a model when Δ≠0 and the nip angle θ is adjusted. The model illustrated in FIG. 9B is different from the model illustrated in FIG. 9A in that the azimuth of the slow axis of the first retardation layer 51 is θ, the retardation value of the second retardation layer 52 is Γ=90°+Δ, and the azimuth of the slow axis of the second retardation layer 52 is 90°−θ.

FIG. 10 illustrates a result of calculating a transmission spectrum at the time of display in black in cases where Δ=0° and θ=45°, Δ=5° and θ=45°, and Δ=5° and θ=37°. A table 1, a table 2, and a table 3 indicate calculation values of the contrast ratio in the three cases described above.

TABLE 1

$Δ = 0°, θ (= θ_1 = θ_2) = 45°$

|  | Axis angle |
|---|---|
| Absorption axis of first linear polarizer | 0° |
| Slow axis of first retardation layer (Re = 137.5 nm) | 45° |
| Liquid crystal cell (VA) | — |
| Slow axis of second retardation layer (Re = 137.5 nm) | 135° |
| Absorption axis of second linear polarizer | 95° |
| Contrast ratio (Calculation value): 1200 | |

TABLE 2

$Δ = 5°, θ (= θ_1 = θ_2) = 45°$

|  | Axis angle |
|---|---|
| Absorption axis of first linear polarizer | 0° |
| Slow axis of first retardation layer (Re = 137.5 nm) | 45° |
| Liquid crystal cell (VA) | — |
| Slow axis of second retardation layer (Re = 137.5 nm) | 135° |
| Absorption axis of second linear polarizer | 90° |
| Contrast ratio (Calculation value): 316 | |

TABLE 3

| $\Delta = 5°$, $\theta (= \theta_1 = \theta_2) = 37°$ | |
|---|---|
| | Axis angle |
| Absorption axis of first linear polarizer | 8° |
| Slow axis of first retardation layer (Re = 137.5 nm) | 45° |
| Liquid crystal cell (VA) | — |
| Slow axis of second retardation layer (Re = 137.5 nm) | 127° |
| Absorption axis of second linear polarizer | 90° |
| Contrast ratio (Calculation value): 1123 | |

As illustrated in FIG. 10, in the case of $\Delta=0°$, display in black becomes the darkest when the nip angle $\theta$ is 45°. In addition, at this time, the contrast ratio is also the highest as 1200. On the other hand, in the case of $\Delta=5°$, when the nip angle $\theta$ is 45° ($(\cos 2\theta)^2/\sin \Delta=0$), light leakage occurs, the transmittance becomes high, and the contrast ratio is low as 316. On the other hand, even in the case of $\Delta=5°$, when the nip angle $\theta$ is 37° ($(\cos 2\theta)^2/\sin \Delta=0.87$), light leakage is suppressed and the transmittance becomes low. In addition, at this time, the contrast ratio is 1123 and the contrast ratio equal to that in the case of $\Delta=0°$ is obtained.

A table 4 indicates a result of calculating $\theta$, by which the contrast ratio is the best, while $\Delta$ is changed from 0° to 20°.

| $\Delta$ [deg] | Contrast ratio (Calculation value) Example | Contrast ratio (Calculation value) Comparative example | $\theta$ by which contrast ratio is best $\theta$ [deg] | $(\cos 2\theta)^2/\sin\Delta$ |
|---|---|---|---|---|
| 0 | 1200 | 1200 | 45 | 0.00 |
| 1 | 1195 | 1080 | 49 | 1.11 |
| 2 | 1190 | 831 | 50 | 0.86 |
| 3 | 1165 | 601 | 51 | 0.83 |
| 4 | 1141 | 434 | 52 | 0.84 |
| 5 | 1123 | 316 | 53 | 0.87 |
| 10 | 798 | 98 | 56 | 0.81 |
| 15 | 485 | 46 | 59 | 0.85 |
| 20 | 273 | 26 | 61 | 0.82 |

In an example indicated in the table 4, the contrast ratio is the best when $(\cos 2\theta)^2/\sin \Delta$ is around 0.8 to 1.2.

Subsequently, the contrast ratio is calculated while the nip angle $\theta$ is changed from 25° to 65° in cases where $\Delta=1°$, 2°, 3°, 4°, 5°, 10°, 15°, and 20°. A table 5 to a table 12 indicate calculation results. The table 5 to the table 12 also indicate values of $(\cos 2\theta)^2/\sin \Delta$ together. In addition, FIGS. 11 to 18 each illustrate a relationship between a value of $(\cos 2\theta)^2/\sin \Delta$ and the contrast ratio for a corresponding one of the cases.

TABLE 5

| $\Delta = 1°$ | | |
|---|---|---|
| Nip angle $\theta$ [deg] | $(\cos 2\theta)^2/\sin \Delta$ | CR ratio (Calculation value) |
| 25 | 23.67 | 18 |
| 26 | 21.72 | 21 |
| 27 | 19.80 | 26 |
| 28 | 17.92 | 32 |
| 29 | 16.09 | 41 |
| 30 | 14.32 | 52 |
| 31 | 12.63 | 68 |
| 32 | 11.01 | 91 |
| 33 | 9.48 | 123 |
| 34 | 8.04 | 172 |
| 35 | 6.70 | 244 |
| 36 | 5.47 | 353 |
| 37 | 4.35 | 511 |
| 38 | 3.35 | 720 |
| 39 | 2.48 | 949 |
| 40 | 1.73 | 1123 |
| 41 | 1.11 | 1195 |
| 42 | 0.63 | 1180 |
| 43 | 0.28 | 1132 |
| 44 | 0.07 | 1093 |
| 45 | 0.00 | 1080 |
| 46 | 0.07 | 1093 |
| 47 | 0.28 | 1132 |
| 47.2 | 0.33 | 1141 |
| 48 | 0.63 | 1180 |
| 48.2 | 0.70 | 1183 |
| 48.8 | 1.00 | 1192 |
| 49 | 1.11 | 1195 |
| 49.7 | 1.50 | 1145 |
| 50 | 1.73 | 1123 |
| 51 | 2.48 | 949 |
| 52 | 3.35 | 720 |
| 53 | 4.35 | 511 |
| 54 | 5.47 | 353 |
| 55 | 6.70 | 244 |
| 56 | 8.04 | 172 |
| 57 | 9.48 | 123 |
| 58 | 11.01 | 91 |
| 59 | 12.63 | 68 |
| 60 | 14.32 | 52 |
| 61 | 16.09 | 41 |
| 62 | 17.92 | 32 |
| 63 | 19.80 | 26 |
| 64 | 21.72 | 21 |
| 65 | 23.67 | 18 |

Figure 11:
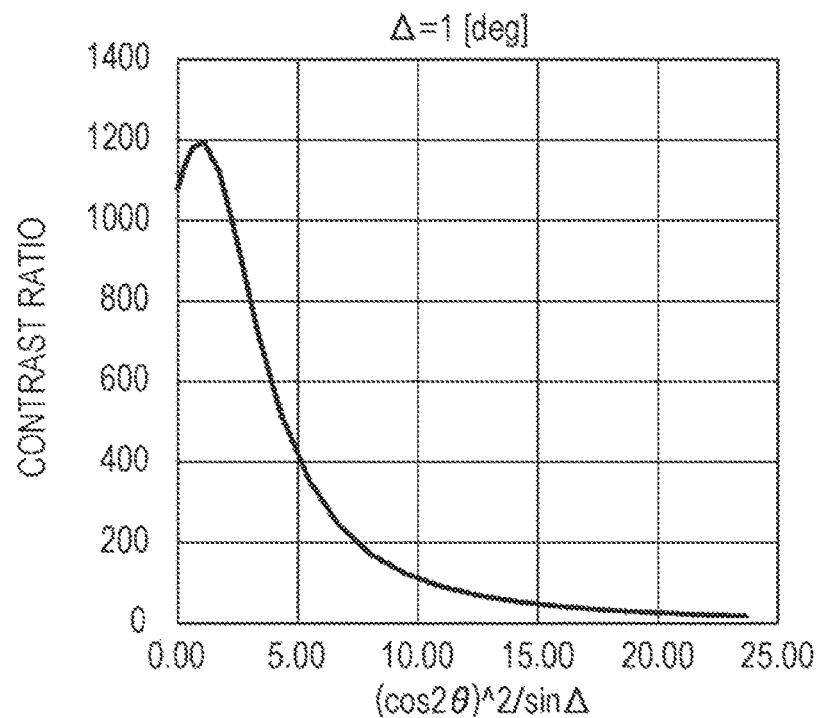
FIG. 11 is a graph illustrating a relationship between a value of $(\cos 2\theta)^2/\sin \Delta$ and the contrast ratio in a case of $\Delta=1°$.

It is found from the table 5 and FIG. 11 that, in the case of $\Delta=1°$, a higher contrast ratio is obtained in a range of the nip angle $\theta=47.2°$ to 49.7° (range of $(\cos 2\theta)^2/\sin \Delta=0.33$ to 1.50) than the case of the nip angle $\theta=45°$ (case of $(\cos 2\theta)^2/\sin \Delta=0$). In particular, a much higher contrast ratio is obtained in a range of the nip angle $\theta=48.2°$ to 48.8° (range of $(\cos 2\theta)^2/\sin \Delta=0.70$ to 1.00).

TABLE 6

| $\Delta = 2°$ | | |
|---|---|---|
| Nip angle $\theta$ [deg] | $(\cos 2\theta)^2/\sin \Delta$ | CR ratio (Calculation value) |
| 25 | 11.84 | 19 |
| 26 | 10.86 | 23 |
| 27 | 9.90 | 28 |
| 28 | 8.96 | 35 |
| 29 | 8.05 | 45 |
| 30 | 7.16 | 58 |
| 31 | 6.32 | 73 |
| 32 | 5.51 | 106 |
| 33 | 4.74 | 148 |
| 34 | 4.02 | 214 |
| 35 | 3.35 | 316 |
| 36 | 2.74 | 474 |
| 37 | 2.18 | 699 |
| 38 | 1.68 | 958 |
| 39 | 1.24 | 1151 |

TABLE 6-continued

Δ = 2°

| Nip angle θ [deg] | $(\cos 2\theta)^2/\sin \Delta$ | CR ratio (Calculation value) |
|---|---|---|
| 40 | 0.86 | 1190 |
| 41 | 0.55 | 1106 |
| 42 | 0.31 | 996 |
| 43 | 0.14 | 906 |
| 44 | 0.03 | 851 |
| 45 | 0.00 | 831 |
| 46 | 0.03 | 851 |
| 47 | 0.14 | 906 |
| 48 | 0.31 | 996 |
| 48.1 | 0.33 | 1007 |
| 49 | 0.55 | 1006 |
| 49.5 | 0.70 | 1148 |
| 50 | 0.86 | 1190 |
| 50.4 | 1.00 | 1174 |
| 51 | 1.24 | 1151 |
| 51.6 | 1.50 | 1035 |
| 52 | 1.68 | 958 |
| 53 | 2.18 | 699 |
| 54 | 2.74 | 474 |
| 55 | 3.35 | 316 |
| 56 | 4.02 | 214 |
| 57 | 4.74 | 148 |
| 58 | 5.51 | 106 |
| 59 | 6.32 | 78 |
| 60 | 7.16 | 58 |
| 61 | 8.05 | 45 |
| 62 | 8.96 | 35 |
| 63 | 9.90 | 28 |
| 64 | 10.86 | 23 |
| 65 | 11.84 | 19 |

Figure 12:
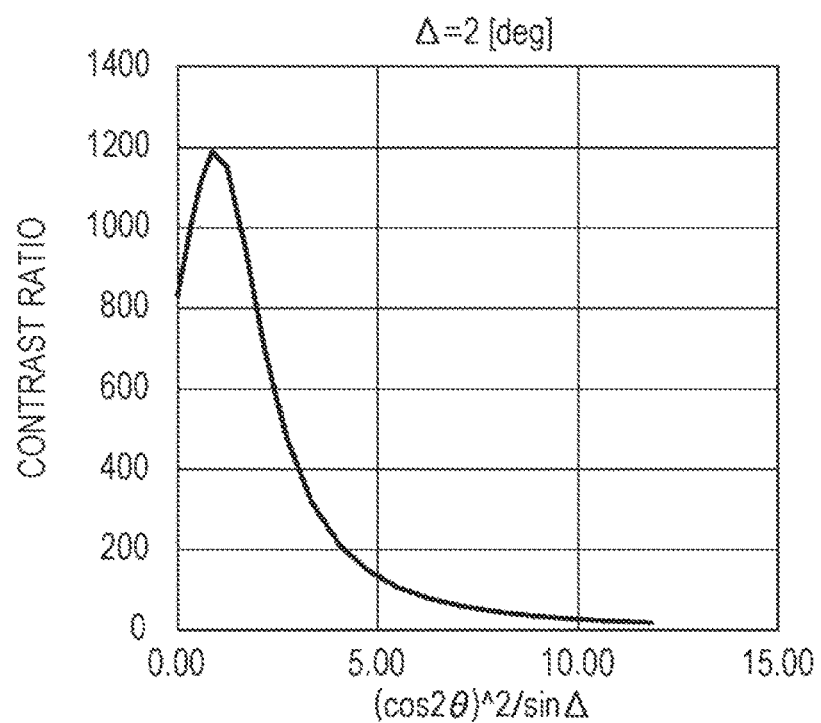
FIG. 12 is a graph illustrating a relationship between the value of $(\cos 2\theta)^2/\sin \Delta$ and the contrast ratio in a case of $\Delta=2°$.

It is found from the table 6 and FIG. 12 that, in the case of Δ=2°, a higher contrast ratio is obtained in a range of the nip angle θ=48.1° to 51.6° (range of $(\cos 2\theta)^2/\sin \Delta$=0.33 to 1.50) than the case of the nip angle θ=45° (case of $(\cos 2\theta)^2/\sin \Delta$=0). In particular, a much higher contrast ratio is obtained in a range of the nip angle θ=49.5° to 50.4° (range of $(\cos 2\theta)^2/\sin \Delta$=0.70 to 1.00).

TABLE 7

Δ = 3°

| Nip angle θ [deg] | $(\cos 2\theta)^2/\sin \Delta$ | CR ratio (Calculation value) |
|---|---|---|
| 25 | 7.89 | 20 |
| 26 | 7.24 | 24 |
| 27 | 6.60 | 30 |
| 28 | 5.97 | 33 |
| 29 | 5.37 | 50 |
| 30 | 4.78 | 66 |
| 31 | 4.21 | 90 |
| 32 | 3.67 | 126 |
| 33 | 3.16 | 182 |
| 34 | 2.68 | 271 |
| 35 | 2.24 | 417 |
| 36 | 1.82 | 640 |
| 37 | 1.45 | 924 |
| 38 | 1.12 | 1146 |
| 39 | 0.83 | 1165 |
| 40 | 0.58 | 1029 |
| 41 | 0.37 | 869 |
| 42 | 0.21 | 745 |
| 43 | 0.09 | 662 |
| 44 | 0.02 | 616 |
| 45 | 0.00 | 601 |
| 46 | 0.02 | 616 |
| 47 | 0.09 | 662 |
| 48 | 0.21 | 745 |

TABLE 7-continued

Δ = 3°

| Nip angle θ [deg] | $(\cos 2\theta)^2/\sin \Delta$ | CR ratio (Calculation value) |
|---|---|---|
| 48.8 | 0.33 | 844 |
| 49 | 0.37 | 869 |
| 50 | 0.58 | 1029 |
| 50.5 | 0.70 | 1097 |
| 51 | 0.83 | 1165 |
| 51.6 | 1.00 | 1154 |
| 52 | 1.12 | 1146 |
| 53 | 1.45 | 924 |
| 53.1 | 1.50 | 895 |
| 54 | 1.82 | 640 |
| 55 | 2.24 | 417 |
| 56 | 2.68 | 271 |
| 57 | 3.16 | 182 |
| 58 | 3.67 | 126 |
| 59 | 4.21 | 90 |
| 60 | 4.78 | 66 |
| 61 | 5.37 | 50 |
| 62 | 5.97 | 38 |
| 63 | 6.60 | 30 |
| 64 | 7.24 | 24 |
| 65 | 7.89 | 20 |

Figure 13:
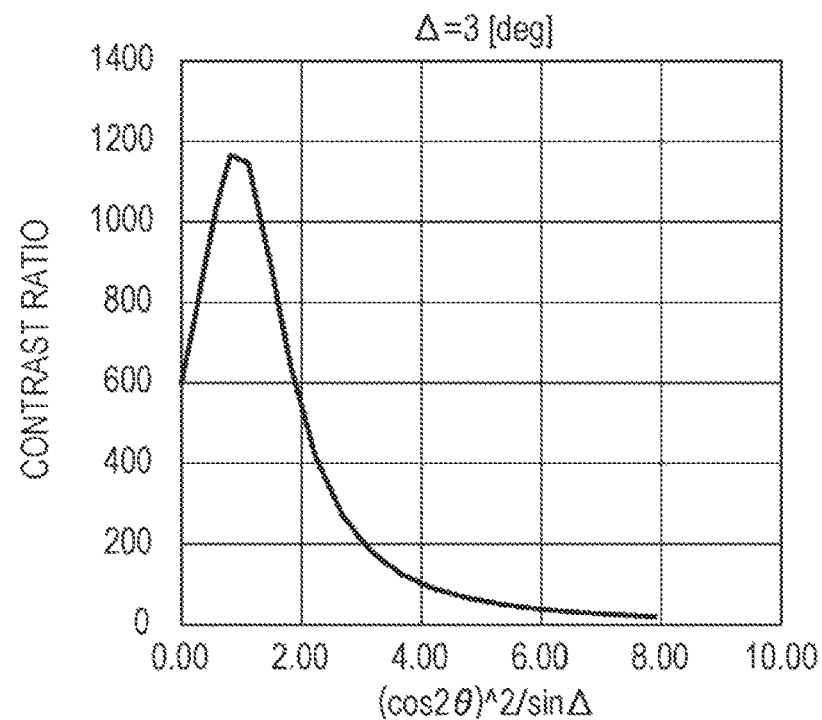
FIG. 13 is a graph illustrating a relationship between the value of $(\cos 2\theta)^2/\sin \Delta$ and the contrast ratio in a case of $\Delta=3°$.

It is found from the table 7 and FIG. 13 that, in the case of Δ=3°, a higher contrast ratio is obtained in a range of the nip angle θ=48.8° to 53.1° (range of $(\cos 2\theta)^2/\sin \Delta$=0.33 to 1.50) than the case of the nip angle θ=45° (case of $(\cos 2\theta)^2/\sin \Delta$=0). In particular, a much higher contrast ratio is obtained in a range of the nip angle θ=50.5° to 51.6° (range of $(\cos 2\theta)^2/\sin \Delta$=0.70 to 1.00).

TABLE 8

Δ = 4°

| Nip angle θ [deg] | $(\cos 2\theta)^2/\sin \Delta$ | CR ratio (Calculation value) |
|---|---|---|
| 25 | 5.92 | 21 |
| 26 | 5.43 | 26 |
| 27 | 4.95 | 33 |
| 28 | 4.48 | 42 |
| 29 | 4.03 | 55 |
| 30 | 3.58 | 75 |
| 31 | 3.16 | 104 |
| 32 | 2.75 | 150 |
| 33 | 2.37 | 225 |
| 34 | 2.01 | 30 |
| 35 | 1.68 | 555 |
| 36 | 1.37 | 848 |
| 37 | 1.09 | 1110 |
| 33 | 0.84 | 1141 |
| 39 | 0.62 | 975 |
| 40 | 0.43 | 762 |
| 41 | 0.28 | 634 |
| 42 | 0.16 | 537 |
| 43 | 0.07 | 477 |
| 44 | 0.02 | 444 |
| 45 | 0.00 | 484 |
| 46 | 0.02 | 444 |
| 47 | 0.07 | 477 |
| 48 | 0.16 | 537 |
| 49 | 0.28 | 684 |
| 49.4 | 0.33 | 693 |
| 50 | 0.43 | 782 |
| 51 | 0.62 | 975 |
| 51.4 | 0.70 | 1041 |
| 52 | 0.84 | 1141 |
| 52.7 | 1.00 | 1119 |
| 53 | 1.09 | 1110 |
| 54 | 1.37 | 848 |

TABLE 8-continued $\Delta = 4°$

| Nip angle $\theta$ [deg] | $(\cos 2\theta)^2/\sin \Delta$ | CR ratio (Calculation value) |
|---|---|---|
| 54.4 | 1.50 | 672 |
| 55 | 1.68 | 555 |
| 56 | 2.01 | 850 |
| 57 | 2.37 | 225 |
| 58 | 2.75 | 150 |
| 59 | 3.16 | 104 |
| 60 | 3.58 | 75 |
| 61 | 4.03 | 55 |
| 62 | 4.48 | 42 |
| 63 | 4.95 | 38 |
| 64 | 5.43 | 26 |
| 65 | 5.92 | 21 |

Figure 14:
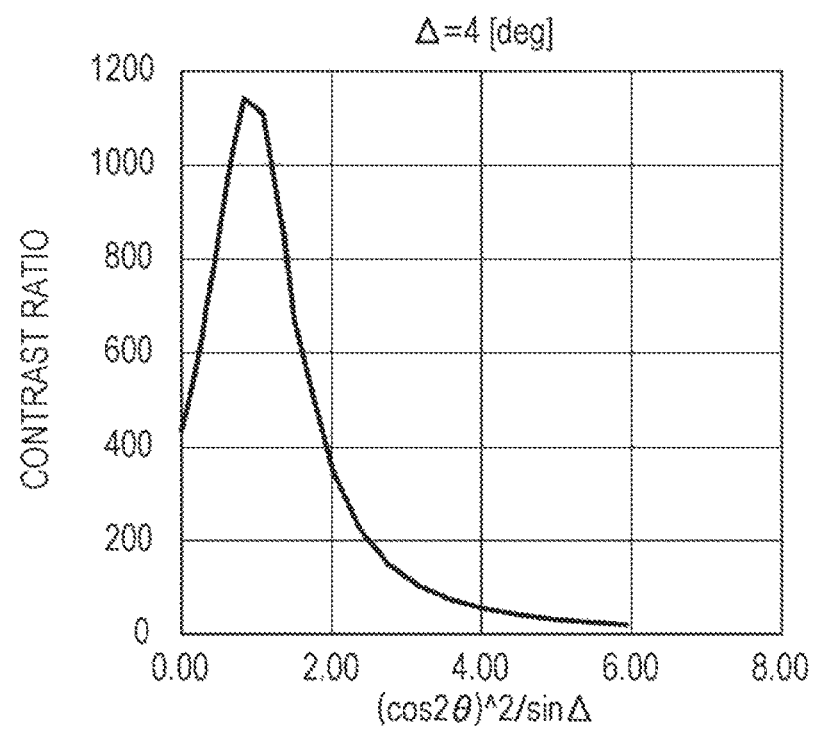
FIG. 14 is a graph illustrating a relationship between the value of $(\cos 2\theta)^2/\sin \Delta$ and the contrast ratio in a case of $\Delta=4°$.

It is found from the table 8 and FIG. 14 that, in the case of $\Delta=4°$, a higher contrast ratio is obtained in a range of the nip angle $\theta=49.4°$ to $54.4°$ (range of $(\cos 2\theta)^2/\sin \Delta=0.33$ to 1.50) than the case of the nip angle $\theta=45°$ (case of $(\cos 2\theta)^2/\sin \Delta=0$). In particular, a much higher contrast ratio is obtained in a range of the nip angle $\theta=51.4°$ to $52.7°$ (range of $(\cos 2\theta)^2/\sin \Delta=0.70$ to 1.00).

TABLE 9

$\Delta = 5°$

| Nip angle $\theta$ [deg] | $(\cos 2\theta)^2/\sin \Delta$ | CR ratio (Calculation value) |
|---|---|---|
| 25 | 4.74 | 22 |
| 26 | 4.35 | 28 |
| 27 | 3.96 | 36 |
| 28 | 3.59 | 47 |
| 29 | 3.22 | 62 |
| 30 | 2.87 | 86 |
| 31 | 2.53 | 123 |
| 32 | 2.20 | 184 |
| 33 | 1.90 | 286 |
| 34 | 1.61 | 462 |
| 35 | 1.34 | 739 |
| 36 | 1.10 | 1040 |
| 37 | 0.87 | 1123 |
| 38 | 0.67 | 942 |
| 39 | 0.50 | 724 |
| 40 | 0.35 | 559 |
| 41 | 0.22 | 453 |
| 42 | 0.13 | 365 |
| 43 | 0.06 | 345 |
| 44 | 0.01 | 323 |
| 45 | 0.00 | 316 |
| 46 | 0.01 | 323 |
| 47 | 0.06 | 345 |
| 48 | 0.13 | 385 |
| 49 | 0.22 | 453 |
| 49.9 | 0.33 | 549 |
| 50 | 0.33 | 559 |
| 51 | 0.50 | 724 |
| 5' | 0.67 | 942 |
| 52.2 | 0.70 | 978 |
| 53 | 0.67 | 1123 |
| 53.6 | 1.00 | 1090 |
| 54 | 1.10 | 1040 |
| 55 | 1.34 | 739 |
| 55.6 | 1.50 | 573 |
| 56 | 1.61 | 462 |
| 57 | 1.90 | 286 |
| 58 | 2.20 | 184 |
| 59 | 2.53 | 123 |
| 60 | 2.87 | 86 |
| 61 | 3.22 | 62 |
| 62 | 3.59 | 47 |

TABLE 9-continued $\Delta = 5°$

| Nip angle $\theta$ [deg] | $(\cos 2\theta)^2/\sin \Delta$ | CR ratio (Calculation value) |
|---|---|---|
| 63 | 3.96 | 36 |
| 64 | 4.35 | 28 |
| 65 | 4.74 | 22 |

Figure 15:
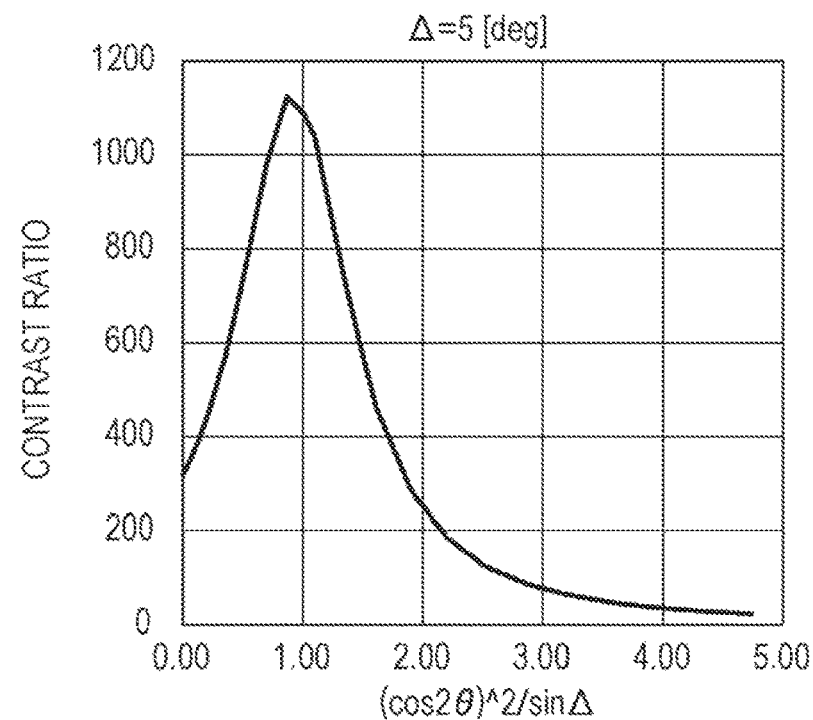
FIG. 15 is a graph illustrating a relationship between the value of $(\cos 2\theta)^2/\sin \Delta$ and the contrast ratio in a case of $\Delta=5°$.

It is found from the table 9 and FIG. 15 that, in the case of $\Delta=5°$, a higher contrast ratio is obtained in a range of the nip angle $\theta=49.9°$ to $55.6°$ (range of $(\cos 2\theta)^2/\sin \Delta=0.33$ to 1.50) than the case of the nip angle $\theta=45°$ (case of $(\cos 2\theta)^2/\sin \Delta=0$). In particular, a much higher contrast ratio is obtained in a range of the nip angle $\theta=52.2°$ to $53.6°$ (range of $(\cos 2\theta)^2/\sin \Delta=0.70$ to 1.00).

TABLE 10

$\Delta = 10°$

| Nip angle $\theta$ [deg] | $(\cos 2\theta)^2/\sin \Delta$ | CR ratio (Calculation value) |
|---|---|---|
| 25 | 2.38 | 31 |
| 26 | 2.18 | 41 |
| 27 | 1.99 | 56 |
| 28 | 1.80 | 80 |
| 29 | 1.62 | 119 |
| 30 | 1.44 | 187 |
| 31 | 1.27 | 311 |
| 32 | 1.11 | 526 |
| 33 | 0.95 | 776 |
| 34 | 0.81 | 798 |
| 35 | 0.67 | 595 |
| 36 | 0.55 | 407 |
| 37 | 0.44 | 288 |
| 33 | 0.34 | 216 |
| 39 | 0.25 | 171 |
| 40 | 0.17 | 143 |
| 41 | 0.11 | 124 |
| 42 | 0.06 | 112 |
| 43 | 0.03 | 104 |
| 44 | 0.01 | 100 |
| 45 | 0.00 | 98 |
| 46 | 0.01 | 100 |
| 47 | 0.03 | 104 |
| 48 | 0.06 | 112 |
| 49 | 0.11 | 124 |
| 50 | 0.17 | 143 |
| 51 | 0.25 | 171 |
| 51.9 | 0.33 | 212 |
| 52 | 0.34 | 216 |
| 53 | 0.44 | 283 |
| 54 | 0.55 | 407 |
| 55 | 0.67 | 595 |
| 55.2 | 0.70 | 635 |
| 56 | 0.61 | 798 |
| 57 | 0.95 | 776 |
| 57.3 | 1.00 | 700 |
| 53 | 1.11 | 526 |
| 59 | 1.27 | 311 |
| 60 | 1.44 | 187 |
| 60.3 | 1.50 | 167 |
| 61 | 1.62 | 119 |
| 62 | 1.80 | 80 |
| 63 | 1.99 | 56 |
| 64 | 2.18 | 41 |
| 65 | 2.38 | 31 |

Figure 16:
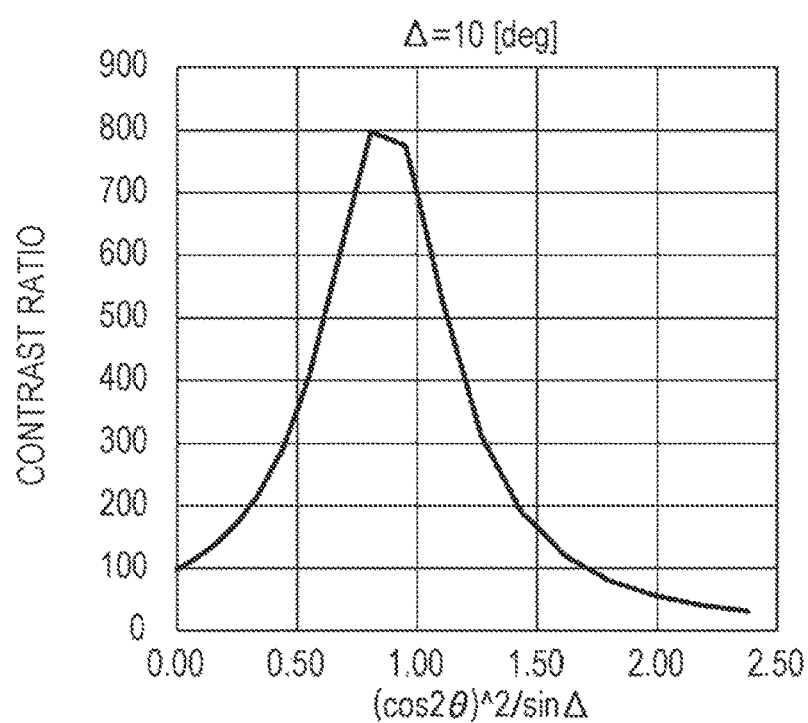
FIG. 16 is a graph illustrating a relationship between the value of $(\cos 2\theta)^2/\sin \Delta$ and the contrast ratio in a case of $\Delta=10°$.

It is found from the table 10 and FIG. 16 that, in the case of $\Delta=10°$, a higher contrast ratio is obtained in a range of the nip angle $\theta=51.9°$ to $60.3°$ (range of $(\cos 2\theta)^2/\sin \Delta=0.33$ to 1.50) than the case of the nip angle $\theta=45°$ (case of (cos $2\theta)^2/\sin \Delta=0$). In particular, a much higher contrast ratio is obtained in a range of the nip angle $\theta=55.2°$ to $57.3°$ (range of $(\cos 2\theta)^2/\sin \Delta=0.70$ to $1.00$).

TABLE 11

$\Delta = 15°$

| Nip angle θ [deg] | $(\cos 2\theta)^2/\sin \Delta$ | CR ratio (Calculation value) |
|---|---|---|
| 25 | 1.60 | 45 |
| 26 | 1.46 | 64 |
| 27 | 1.33 | 94 |
| 28 | 1.21 | 146 |
| 29 | 1.08 | 235 |
| 30 | 0.97 | 371 |
| 31 | 0.85 | 485 |
| 32 | 0.74 | 449 |
| 33 | 0.64 | 327 |
| 34 | 0.54 | 226 |
| 35 | 0.45 | 162 |
| 36 | 0.37 | 122 |
| 37 | 0.29 | 96 |
| 38 | 0.23 | 79 |
| 39 | 0.17 | 68 |
| 40 | 0.12 | 60 |
| 41 | 0.07 | 54 |
| 42 | 0.04 | 50 |
| 43 | 0.02 | 48 |
| 44 | 0.00 | 46 |
| 45 | 0.00 | 46 |
| 46 | 0.00 | 46 |
| 47 | 0.02 | 48 |
| 48 | 0.04 | 50 |
| 49 | 0.07 | 54 |
| 50 | 0.12 | 60 |
| 51 | 0.17 | 68 |
| 52 | 0.23 | 79 |
| 53 | 0.29 | 96 |
| 53.5 | 0.33 | 109 |
| 54 | 0.37 | 122 |
| 55 | 0.45 | 162 |
| 56 | 0.54 | 226 |
| 57 | 0.64 | 327 |
| 57.6 | 0.70 | 400 |
| 58 | 0.74 | 449 |
| 59 | 0.85 | 485 |
| 60 | 0.97 | 371 |
| 60.3 | 1.00 | 331 |
| 61 | 1.08 | 235 |
| 62 | 1.21 | 146 |
| 63 | 1.33 | 94 |
| 64 | 1.46 | 64 |
| 64.3 | 1.50 | 58 |
| 65 | 1.60 | 45 |

Figure 17:
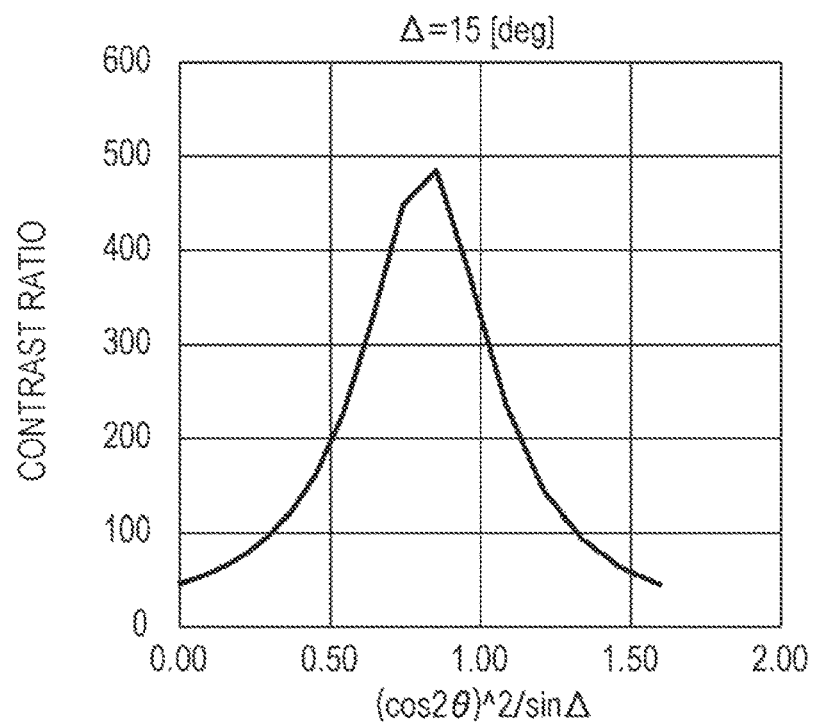
FIG. 17 is a graph illustrating a relationship between the value of $(\cos 2\theta)^2/\sin \Delta$ and the contrast ratio in a case of $\Delta=15°$.

It is found from the table 11 and FIG. 17 that, in the case of $\Delta=15°$, a higher contrast ratio is obtained in a range of the nip angle $\theta=53.5°$ to $64.3°$ (range of $(\cos 2\theta)^2/\sin \Delta=0.33$ to $1.50$) than the case of the nip angle $\theta=45°$ (case of $(\cos 2\theta)^2/\sin \Delta=0$). In particular, a much higher contrast ratio is obtained in a range of the nip angle $\theta=57.6°$ to $60.3°$ (range of $(\cos 2\theta)^2/\sin \Delta=0.70$ to $1.00$).

TABLE 12

$\Delta = 20°$

| Nip angle θ [deg] | $(\cos 2\theta)^2/\sin \Delta$ | CR ratio (Calculation value) |
|---|---|---|
| 25 | 1.21 | 65 |
| 26 | 1.11 | 96 |
| 27 | 1.01 | 145 |
| 28 | 0.91 | 214 |
| 29 | 0.82 | 273 |
| 30 | 0.73 | 269 |
| 31 | 0.64 | 214 |
| 32 | 0.56 | 155 |
| 33 | 0.48 | 114 |
| 34 | 0.41 | 86 |
| 35 | 0.34 | 68 |
| 36 | 0.28 | 55 |
| 37 | 0.22 | 46 |
| 38 | 0.17 | 40 |
| 39 | 0.13 | 36 |
| 40 | 0.09 | 32 |
| 41 | 0.06 | 30 |
| 42 | 0.03 | 28 |
| 43 | 0.01 | 27 |
| 44 | 0.00 | 27 |
| 45 | 0.00 | 26 |
| 46 | 0.00 | 27 |
| 47 | 0.01 | 27 |
| 48 | 0.03 | 28 |
| 49 | 0.06 | 30 |
| 50 | 0.09 | 32 |
| 51 | 0.13 | 36 |
| 52 | 0.17 | 40 |
| 53 | 0.22 | 46 |
| 54 | 0.28 | 55 |
| 54.8 | 0.33 | 65 |
| 55 | 0.34 | 68 |
| 56 | 0.41 | 86 |
| 57 | 0.48 | 114 |
| 58 | 0.56 | 155 |
| 59 | 0.64 | 214 |
| 59.6 | 0.70 | 247 |
| 60 | 0.73 | 269 |
| 61 | 0.62 | 273 |
| 62 | 0.91 | 214 |
| 62.9 | 1.00 | 151 |
| 63 | 1.01 | 145 |
| 64 | 1.11 | 96 |
| 65 | 1.21 | 65 |
| 67.9 | 1.50 | 30 |

Figure 18:
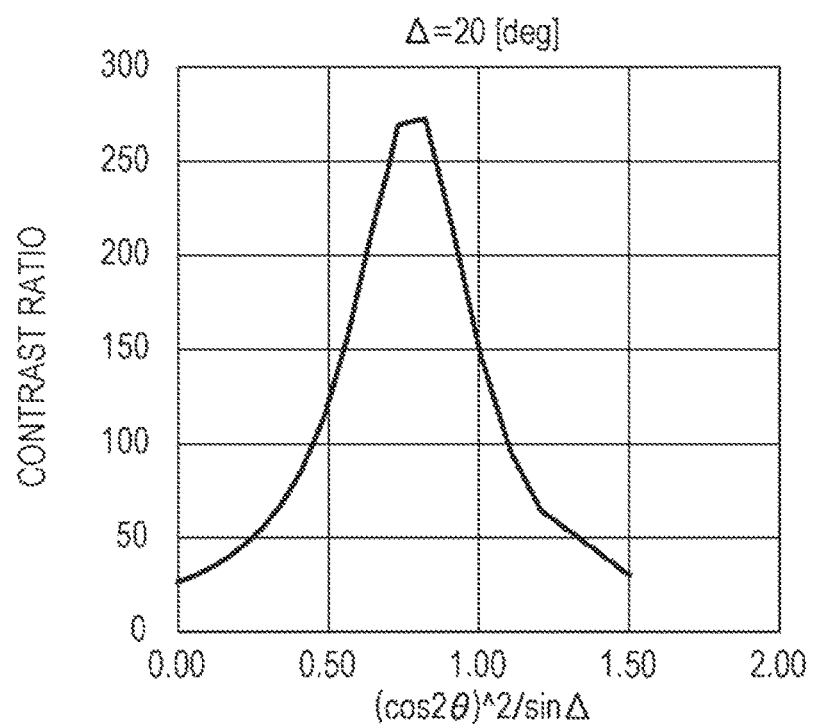
FIG. 18 is a graph illustrating a relationship between the value of $(\cos 2\theta)^2/\sin \Delta$ and the contrast ratio in a case of $\Delta=200$.

It is found from the table 12 and FIG. 18 that, in the case of $\Delta=20°$, a higher contrast ratio is obtained in a range of the nip angle $\theta=54.8°$ to $67.9°$ (range of $(\cos 2\theta)^2/\sin \Delta=0.33$ to $1.50$) than the case of the nip angle $\theta=45°$ (case of $(\cos 2\theta)^2/\sin \Delta=0$). In particular, a much higher contrast ratio is obtained in a range of the nip angle $\theta=59.6°$ to $62.9°$ (range of $(\cos 2\theta)^2/\sin \Delta=0.70$ to $1.00$).

It is found from the calculation results described above that $\frac{1}{3} \leq (\cos 2\theta)^2/\sin \Delta \leq \frac{3}{2}$ may be provided to improve the contrast ratio, that is, to achieve a higher contrast ratio than that in the case of $\theta=45°$. Accordingly, by arranging the first linear polarizer 41, the first retardation layer 51, the second linear polarizer 42, and the second retardation layer 52 so that the front-side nip angle $\theta_1$ and the back-side nip angle $\theta_2$ satisfy the formulas (A) and (B) that have been described, the contrast ratio is able to be improved.

In addition, it is found from the calculation results described above that a much higher contrast ratio is obtained when $0.7 \leq (\cos 2\theta)^2/\sin \Delta \leq 1.0$ is provided. Accordingly, the first linear polarizer 41, the first retardation layer 51, the second linear polarizer 42, and the second retardation layer 52 are preferably arranged so that the following formulas (C) and (D) are satisfied.

$$0.7 \leq (\cos 2\theta_1)^2/\sin \Delta \leq 1.0 \quad \text{(C)}$$

$$0.7 \leq (\cos 2\theta_2)^2/\sin \Delta \leq 1.0 \quad \text{(D)}$$

As described above, according to the embodiment of the invention, reduction of the contrast ratio caused by manufacturing variation in the retardation of the retardation layers is suppressed.

Note that, the arrangement of the first linear polarizer 41, the second linear polarizer 42, the first retardation layer 51, and the second retardation layer 52 is not limited to the one exemplified here as long as being optically equivalent to the exemplified arrangement. For example, the first retardation layer 51 and the second retardation layer 52 may be arranged (that is, made in an in-cell form) in the liquid crystal cell 1. In addition, the first linear polarizer 41 and the second linear polarizer 42 may be also arranged in the liquid crystal cell 1.

Further, a material of the first linear polarizer 41, the second linear polarizer 42, the first retardation layer 51, and the second retardation layer 52 is not limited to the one exemplified here, either. For example, as the material of the first linear polarizer 41, the second linear polarizer 42, the first retardation layer 51, and the second retardation layer 52, a liquid crystal material is also usable.

Note that, though an example in which both of the front-side nip angle $\theta_1$ and the back-side nip angle $\theta_2$ are adjusted has been described here, it is not always necessary for both of the front-side nip angle $\theta_1$ and the back-side nip angle $\theta_2$ to be adjusted (deviated from 45°). Only one of the front-side nip angle $\theta_1$ and the back-side nip angle $\theta_2$ may be adjusted. That is, when the first linear polarizer 41, the first retardation layer 51, the second linear polarizer 42, and the second retardation layer 52 are arranged so that at least one of the formulas (A) and (B) described above (preferably, at least one of the formulas (C) and (D)) is satisfied, an effect of improving the contrast ratio is able to be achieved. Further, when both of the formulas (A) and (B) (preferably, both of the formulas (C) and (D)) are satisfied, it is possible to achieve further improvement of the contrast ratio.

Embodiment 2

Figure 19:
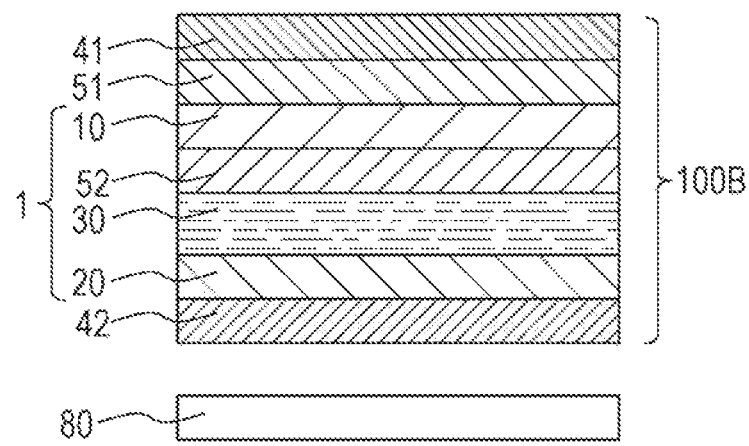
FIG. 19 is a sectional view schematically illustrating a liquid crystal display panel 100B according to an embodiment of the invention.

A liquid crystal display panel 100B of the present embodiment will be described with reference to FIG. 19. FIG. 19 is a sectional view schematically illustrating the liquid crystal display panel 100B and illustrates the backlight 80 together. A difference of the liquid crystal display panel 100B from the liquid crystal display panel 100A of Embodiment 1 will be mainly described below.

In the liquid crystal display panel 100A of Embodiment 1, the liquid crystal layer 30 of the liquid crystal cell 1 is the vertical alignment type. On the other hand, in the liquid crystal display panel 100B of the present embodiment, the liquid crystal layer 30 of the liquid crystal cell 1 is a horizontal alignment type. That is, the liquid crystal molecules of the liquid crystal layer 30 take a horizontally aligned state when no voltage is applied to the liquid crystal layer 30. Though not illustrated here, a pair of horizontal alignment films is provided on both sides of the liquid crystal layer 30 and alignment controlling forces of the horizontal alignment films achieve the horizontally aligned state.

An example of a display mode using the liquid crystal layer 30 of the horizontal alignment type includes a transverse electrical field mode such as an IPS (in-plane switching) mode or an FFS (fringe-field switching) mode. In a case of the transverse electrical field mode, a pixel electrode and a common electrode (which are not illustrated here) are provided in the second substrate (active matrix substrate) 20 of the liquid crystal cell 1.

Moreover, in the liquid crystal display panel 100B, the second retardation layer 52 is arranged between the first retardation layer 51 and the liquid crystal layer 30 and arranged in the liquid crystal cell 1. As the second retardation layer 52 arranged in the liquid crystal cell 1, a retardation plate of a coating type is suitably usable.

Also in the liquid crystal display panel 100B of the present embodiment, when the first linear polarizer 41, the first retardation layer 51, the second linear polarizer 42, and the second retardation layer 52 are arranged so that at least one (preferably, both) of the formulas (A) and (B) is satisfied, reduction of the contrast ratio caused by manufacturing variation in the retardation of the retardation layers is suppressed. Further, when at least one (preferably, both) of the formulas (C) and (D) is satisfied, it is possible to achieve further improvement of the contrast ratio.

Since the manufacturing variation in the retardation is remarkable particularly in a retardation plate of a coating type, it may be stated that use of an embodiment of the invention is significant when the retardation plate of the coating type is used as a retardation layer (here, the second retardation layer 52) arranged in the liquid crystal cell 1.

Other Embodiments

Figure 20:
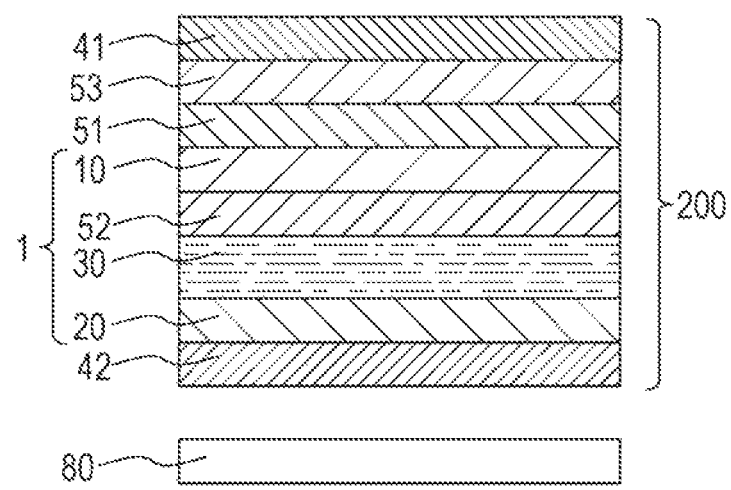
FIG. 20 is a sectional view schematically illustrating a liquid crystal display panel 200 to which an embodiment of the invention can be applied.

A liquid crystal display panel 200 to which an embodiment of the invention can be applied will be described with reference to FIG. 20. FIG. 20 is a sectional view schematically illustrating the liquid crystal display panel 200 and illustrates the backlight 80 together. A difference of the liquid crystal display panel 200 from the liquid crystal display panel 100B of Embodiment 2 will be mainly described below.

The liquid crystal display panel 200 has the liquid crystal cell 1 of a TN mode. Further, the liquid crystal display panel 200 includes a third retardation layer 53 arranged between the first linear polarizer 41 and the first retardation layer 51. The third retardation layer 53 is specifically a $\lambda/2$ plate.

Figure 21:
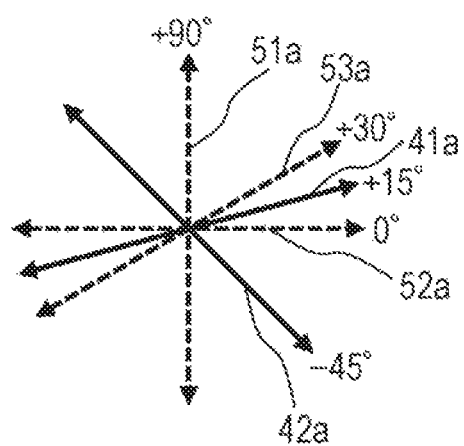
FIG. 21 illustrates an example of a relationship between the absorption axes 41a and 42a of the first linear polarizer 41 and the second linear polarizer 42 and slow axes 51a, 52a, and 53a of the first retardation layer 51, the second retardation layer 52, and a third retardation layer ($\lambda/2$ plate) 53.

FIG. 21 illustrates an example of a relationship between the absorption axes 41a and 42a of the first linear polarizer 41 and the second linear polarizer 42 and slow axes 51a, 52a, and 53a of the first retardation layer 51, the second retardation layer 52, and the third retardation layer ($\lambda/2$ plate) 53. Note that, the example illustrated in FIG. 21 is an example when the embodiment of the invention is not applied.

In the example illustrated in FIG. 21, azimuths of the absorption axis 41a of the first linear polarizer 41, the slow axis 53a of the $\lambda/2$ plate 53, and the slow axis 51a of the first retardation layer 51 are respectively 15°, 30°, and 90°. Thus, an angle formed by the absorption axis 41a of the first linear polarizer 41 and the slow axis 53a of the $\lambda/2$ plate 53 is 15° and an angle formed by the slow axis 53a of the $\lambda/2$ plate 53 and the slow axis 51a of the first retardation layer 51 is 60°. In addition, azimuths of the absorption axis 42a of the second linear polarizer 42 and the slow axis 52a of the second retardation layer 52 are respectively −45° and 0°. Thus, an angle formed by the absorption axis 42a of the second linear polarizer 42 and the slow axis 52a of the second retardation layer 52 is 45°.

In the liquid crystal display panel 200, the $\lambda/2$ plate (third retardation layer) 53 is arranged between the first linear polarizer 41 and the first retardation layer 51. By optimizing an axis angle between the first retardation layer 51 and the $\lambda/2$ plate 53, it is possible to make light, which is transmitted through the first linear polarizer 41, the first retardation layer 51, and the third retardation layer ($\lambda/2$ plate) 53 from the observer side, close to circularly polarized light in an entire wavelength (that is, to reduce wavelength dispersion in a polarized state).

Also in the liquid crystal display panel 200, by adjusting the angle (back-side nip angle) $\theta_2$ formed by the absorption axis 42a of the second linear polarizer 42 and the slow axis 52a of the second retardation layer 52 so that the formula (B) (preferably, the formula (D)) is satisfied, the contrast ratio is able to be improved.

According to the embodiment of the invention, a liquid crystal display panel in which reduction of the contrast ratio caused by manufacturing variation in retardation of the retardation layers is suppressed is provided.

This application is based on U.S. Provisional Application No. 62/731,590 filed on Sep. 14, 2018, the entire contents of which are hereby incorporated by reference.

What is claimed is:

1. A liquid crystal display panel comprising:
   a liquid crystal cell that has a first substrate, a second substrate arranged on a back surface side of the first substrate, and a liquid crystal layer provided between the first substrate and the second substrate;
   a first linear polarizer arranged on an observer side of the liquid crystal cell;
   a second linear polarizer arranged on a back surface side of the liquid crystal cell;
   a first retardation layer arranged between the first linear polarizer and the liquid crystal layer; and
   a second retardation layer arranged between the first retardation layer and the second linear polarizer, wherein
   an absorption axis of the first linear polarizer and an absorption axis of the second linear polarizer cross,
   each of a combination of the first linear polarizer and the first retardation layer and a combination of the second linear polarizer and the second retardation layer functions as a circularly polarizing plate or an elliptically polarizing plate,
   retardation of the first retardation layer and retardation of the second retardation layer for light with a wavelength of 550 nm are different, and
   the first linear polarizer, the first retardation layer, the second linear polarizer, and the second retardation layer are arranged so that at least one of following formulas (A) and (B) is satisfied:

$$\frac{1}{3} \leq (\cos 2\theta_1)^2/\sin \Delta \leq \frac{3}{2} \qquad (A)$$

$$\frac{1}{3} \leq (\cos 2\theta_2)^2/\sin \Delta \leq \frac{3}{2} \qquad (B)$$

where a difference between the retardation of the first retardation layer and the retardation of the second retardation layer for the light with the wavelength of 550 nm is $\Delta$ [rad], an angle formed by the absorption axis of the first linear polarizer and a slow axis of the first retardation layer is $\theta_1$, and an angle formed by the absorption axis of the second linear polarizer and a slow axis of the second retardation layer is $\theta_2$.

2. The liquid crystal display panel according to claim 1, wherein the first linear polarizer, the first retardation layer, the second linear polarizer, and the second retardation layer are arranged so that both of the formulas (A) and (B) are satisfied.

3. The liquid crystal display panel according to claim 1, wherein the first linear polarizer, the first retardation layer, the second linear polarizer, and the second retardation layer are arranged so that at least one of following formulas (C) and (D) is satisfied:

$$0.7 \leq (\cos 2\theta_1)^2/\sin \Delta \leq 1.0 \qquad (C)$$

$$0.7 \leq (\cos 2\theta_2)^2/\sin \Delta \leq 1.0 \qquad (D).$$

4. The liquid crystal display panel according to claim 3, wherein the first linear polarizer, the first retardation layer, the second linear polarizer, and the second retardation layer are arranged so that both of the formulas (C) and (D) are satisfied.

5. The liquid crystal display panel according to claim 1, wherein the liquid crystal layer is a liquid crystal layer of a vertical alignment type.

6. The liquid crystal display panel according to claim 1, wherein the liquid crystal layer is a liquid crystal layer of a horizontal alignment type.

7. The liquid crystal display panel according to claim 1, wherein the second retardation layer is arranged between the liquid crystal layer and the second linear polarizer.

8. The liquid crystal display panel according to claim 1, wherein the second retardation layer is arranged between the first retardation layer and the liquid crystal layer.

9. The liquid crystal display panel according to claim 1, wherein at least one of the first retardation layer and the second retardation layer is arranged in the liquid crystal cell.

10. The liquid crystal display panel according to claim 1, wherein at least one of the first retardation layer and the second retardation layer is a retardation plate of a coating type.

* * * * *